US012502782B2

(12) United States Patent
Tsuchiya

(10) Patent No.: US 12,502,782 B2
(45) Date of Patent: Dec. 23, 2025

(54) EXAMINATION METHOD FOR EXAMINING ROBOT APPARATUS, CONTROL APPARATUS, AND STORAGE MEDIUM

(71) Applicant: CANON KABUSHIKI KAISHA, Tokyo (JP)

(72) Inventor: Yutaka Tsuchiya, Hiratsuka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/390,633

(22) Filed: Dec. 20, 2023

(65) Prior Publication Data

US 2024/0139953 A1 May 2, 2024

Related U.S. Application Data

(63) Continuation of application No. 16/709,764, filed on Dec. 10, 2019, now Pat. No. 11,897,146.

(30) Foreign Application Priority Data

Dec. 18, 2018 (JP) .................................. 2018-236578
Mar. 1, 2019 (JP) .................................. 2019-038013

(51) Int. Cl.
*B25J 9/16* (2006.01)
*B25J 19/02* (2006.01)

(52) U.S. Cl.
CPC ........... *B25J 9/1674* (2013.01); *B25J 19/026* (2013.01)

(58) Field of Classification Search
CPC .... B25J 9/1674; B25J 19/026; B25J 19/0095; B25J 9/16; B25J 9/1664; B25J 19/00; G05B 2219/40164
See application file for complete search history.

(56) References Cited

U.S. PATENT DOCUMENTS 2,872,807 A * 2/1959 Kolisch ................... G06G 7/70
  73/65.06
6,442,436 B1 * 8/2002 Nogami ............. G06F 11/3404
  318/567
(Continued)

FOREIGN PATENT DOCUMENTS

CN  203629654 U  *  6/2014
CN  109202894 B  *  6/2020  .............. B25J 9/163
(Continued)

OTHER PUBLICATIONS

Klinger, Alexander, and Brian A. Weiss. "Robotic Work Cell Test Bed to Support Measurement Science for Monitoring, Diagnostics, and Prognostics." In International Manufacturing Science and Engineering Conference, vol. 51371, p. V003T02A030. American Society of Mechanical Engineers, 2018 (Year: 2018).*

*Primary Examiner* — Douglas Kay
(74) *Attorney, Agent, or Firm* — Canon U.S.A., Inc. IP Division

(57) ABSTRACT

A method for examining a robot apparatus which includes a driving source configured to drive a joint, the position and orientation of which are controlled based on trajectory data determined in advance for a normal motion. The examination method includes generating examination motion data for driving a joint as an examination target under a driving speed that causes the examination target joint to resonate and causing the examination target joint to pass through a path based on the trajectory data. A resonance amplitude of the joint is acquired based on the examination motion data.

28 Claims, 16 Drawing Sheets

(56) References Cited

U.S. PATENT DOCUMENTS

| | | | |
|---|---|---|---|
| 11,897,146 B2* | 2/2024 | Tsuchiya | B25J 9/1674 |
| 2017/0066131 A1* | 3/2017 | Kamikawa | B25J 9/1697 |
| 2017/0087719 A1* | 3/2017 | Tsuchiya | G05B 19/4065 |
| 2018/0089787 A1* | 3/2018 | Kim | G06T 7/246 |
| 2018/0117758 A1* | 5/2018 | Wang | B25J 9/0081 |
| 2018/0241283 A1* | 8/2018 | Kokubo | G01D 5/145 |
| 2020/0092182 A1* | 3/2020 | Nakamura | H04L 43/065 |

FOREIGN PATENT DOCUMENTS

| | | | | |
|---|---|---|---|---|
| CN | 118023777 A * | 5/2024 | | B23K 37/006 |
| DE | 102015210218 B4 * | 11/2024 | | G05B 19/423 |
| JP | 2002082712 A * | 3/2002 | | |
| JP | 2003067427 A * | 3/2003 | | |
| JP | 2006253616 A * | 9/2006 | | |
| JP | 2009195406 A * | 9/2009 | | |
| KR | 101597238 B1 * | 2/2016 | | |
| WO | WO-2015137140 A1 * | 9/2015 | | A61B 34/30 |

* cited by examiner

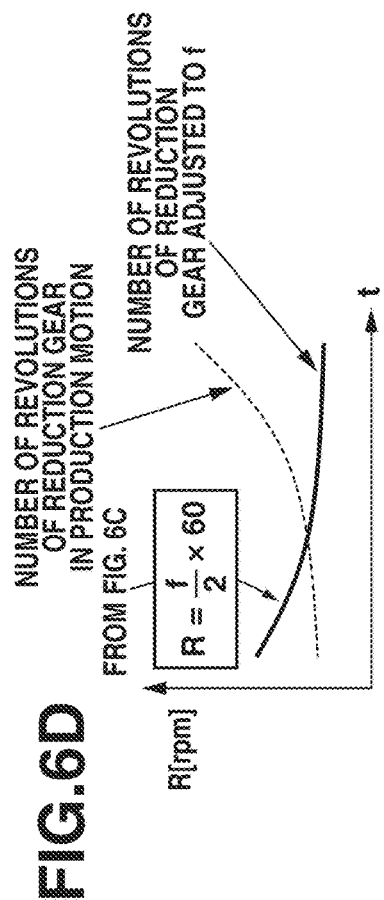
FIG.6A
FIG.6B
FIG.6C
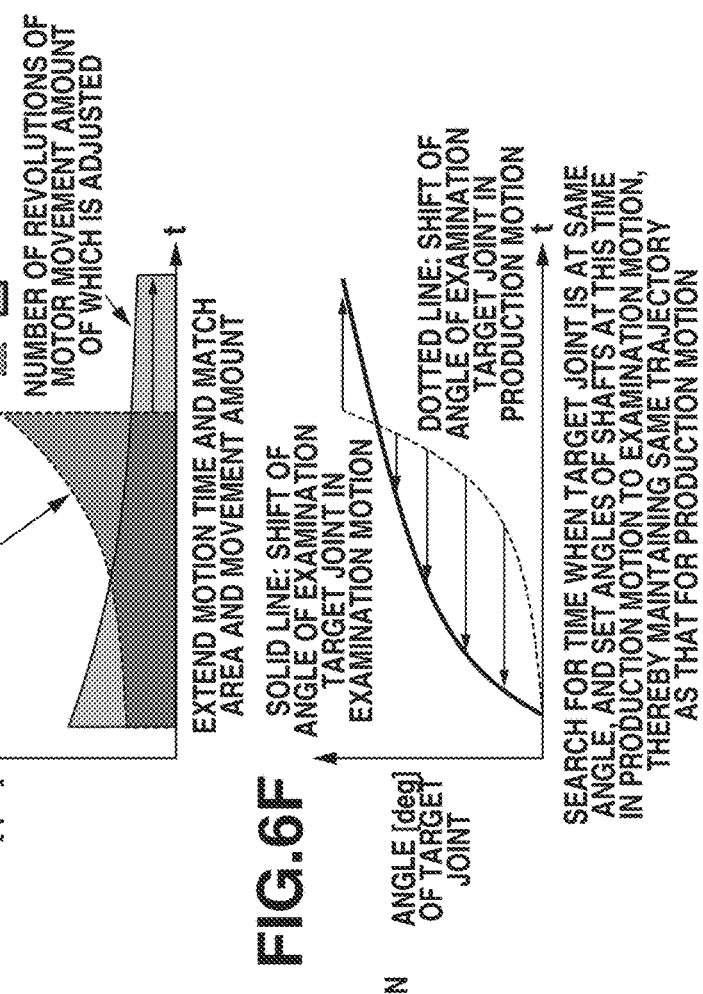
FIG.6D
FIG.6E
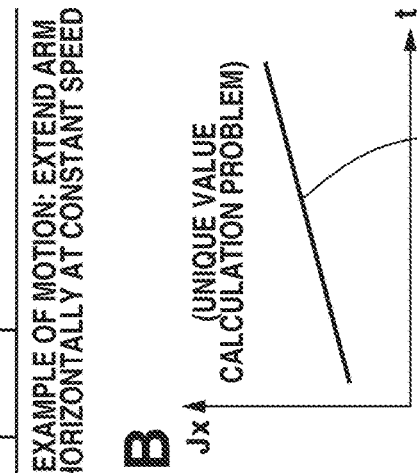
FIG.6F

FIG.12A
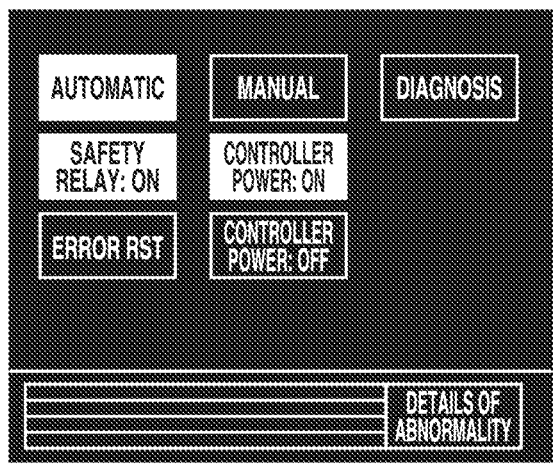
FIG.12B
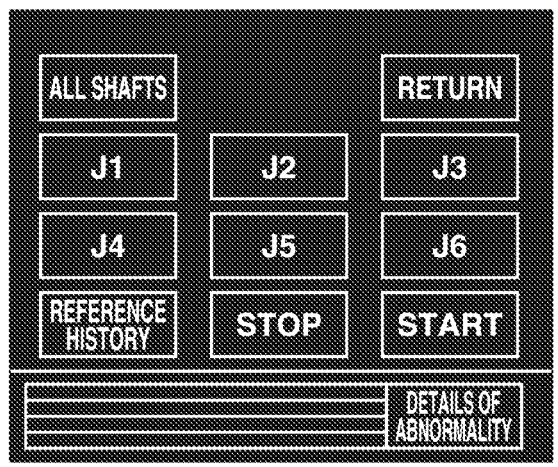
FIG.12C
FIG.12D
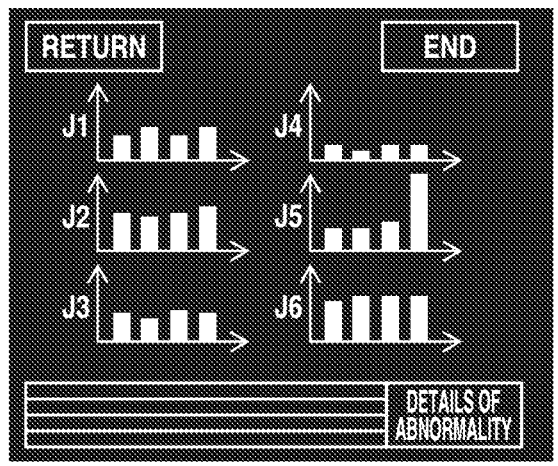

EXAMINATION METHOD FOR EXAMINING ROBOT APPARATUS, CONTROL APPARATUS, AND STORAGE MEDIUM

CROSS-REFERENCE TO RELATED APPLICATIONS

This application is a Continuation of U.S. patent application Ser. No. 16/709,764, filed Dec. 10, 2019, which claims the benefit of Japanese Patent Applications No. 2018-236578, filed Dec. 18, 2018, and No. 2019-038013, filed Mar. 1, 2019, all of which are hereby incorporated by reference herein in their entirety.

BACKGROUND

Field

The present disclosure relates to an examination method for examining a robot apparatus which includes a driving source configured to drive a joint, and the position and orientation of which are controlled based on trajectory data, a control program for a robot apparatus, and a robot system.

Description of the Related Art

In recent years, in the industrial production field, a production (manufacturing) apparatus using a multijoint robot apparatus (hereinafter referred to as a "robot apparatus") capable of achieving complex and high-speed article manufacturing work like a human hand is increasingly prevalent. A robot apparatus of this type capable of making a complex motion has a high degree of freedom in the motion of a robot arm, and accordingly, the robot arm may contact or interfere with another object such as a workpiece or a tool in the peripheral environment of the robot arm during work. For example, if the robot arm contacts an object near the robot arm and an impact is applied to a transmission (a reduction gear) placed in a joint of the arm, this may cause a failure such as tooth skipping in the reduction gear.

An actuator that drives a joint of a robot arm of this type includes, for example, a servomotor and a transmission. Generally, a transmission of this type is often configured as a reduction gear due to the relationship between a number-of-revolutions range of a rotational driving source such as a servomotor and a number-of-revolutions range for rotating a link of the arm. Thus, in the following description, as a representative of a transmission used in a robot apparatus of this type, a reduction gear will be occasionally exemplified.

As this transmission, a transmission using a strain wave gearing mechanism capable of obtaining a large reduction ratio for its size and shape is widely used. In the transmission (the reduction gear) using the strain wave gearing mechanism, the angle transmission accuracy of the joint may decrease due to a failure such as tooth skipping, and the operation accuracy of the robot arm may decrease.

In view of the above circumstances, in recent years, various techniques are discussed regarding the interference and the collision of a robot arm.

As a technique for detecting the state of a transmission of a joint after the interference or the collision of an arm, for example, the publication of Japanese Patent Application Laid-Open No. 2009-202335 discusses a technique for temporarily stopping operation of joints other than a joint which is an examination target, comparing a reference value with a torque detection value obtained when a predetermined position command is given to only the target joint to make a predetermined motion, and determining an abnormality of a transmission.

Further, the publication of Japanese Patent Application Laid-Open No. 2006-281421 discusses a technique for maintaining an actuator of a joint for a certain time at a speed that causes the robot to resonate most, and detecting the vibration of the arm that occurs at this time. The vibration of the arm is detected using a torque fluctuation value calculated from a motor torque value, and the range of the fluctuation is compared with a threshold, thereby determining an abnormality.

However, in the technique discussed in the publication of Japanese Patent Application Laid-Open No. 2009-202335, the joints other than the examination target are stopped. This results in a motion different from that in a case where a normal motion is carried out based on trajectory data. An area through which the arm or the hand passes is also different from that in the case of the normal motion. Thus, if an examination is performed, the following risk occurs. For example, the arm or the hand collides with peripheral equipment placed so that the arm or the hand does not hit the peripheral equipment in a normal motion state, such as equipment where a workpiece or a tool is retracted. To avoid this risk, it is necessary to remove the robot from the apparatus, place the robot in a wide workspace again to perform the examination, or temporarily have related equipment placed near the robot retracted. Worse still, if such avoidance measures are taken, then in addition to the work of restoring the robot and the peripheral equipment, the work of confirming the positional accuracy is necessary. Thus, it also takes a long time to restore the apparatus.

Further, in the technique discussed in the publication of Japanese Patent Application Laid-Open No. 2006-281421, it is known that the driving speed of the joint that causes the robot to resonate most somewhat deviates due to the individual difference of the robot or the state of the joint. Thus, in a case where the method of the publication of Japanese Patent Application Laid-Open No. 2006-281421 is actually performed, it is necessary to drive the joint at a constant speed for a plurality of times by changing the speed little by little and search the driving results for a point where the resonance is greatest. Thus, it takes time to perform an examination.

SUMMARY

According to an aspect of the present disclosure, an examination method for examining a robot apparatus which includes a driving source configured to drive a joint, the position and orientation of which are controlled based on trajectory data determined in advance for a normal motion. The method includes generating examination motion data for driving a joint as an examination target under a driving speed that causes the examination target joint to resonate, and causing the examination target joint to pass through a path based on the trajectory data. A resonance amplitude of the joint is acquired based on the examination motion data.

Further features of the present disclosure will become apparent from the following description of exemplary embodiments with reference to the attached drawings.

BRIEF DESCRIPTION OF THE DRAWINGS

FIGS. 6A to 6F are diagrams illustrating a procedure for generating an examination motion while maintaining a production trajectory in the examination (or diagnosis) of the robot apparatus in FIG. 1.

FIGS. 12A to 12D are diagrams illustrating user interface (UI) screens on which diagnosis is made.

DESCRIPTION OF THE EMBODIMENTS

Figure 1:
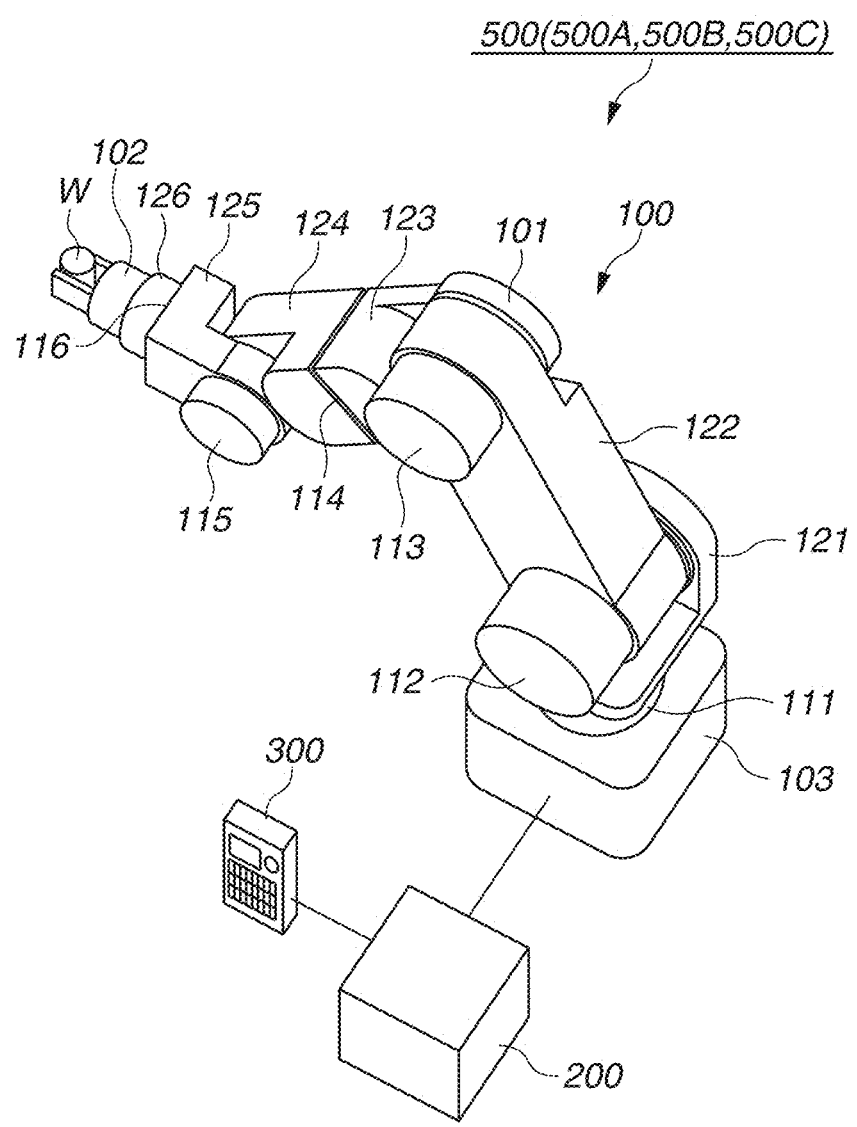
FIG. 1 is a perspective view illustrating an overall configuration of a robot apparatus according to an exemplary embodiment of the present disclosure.

With reference to the attached drawings, exemplary embodiments for carrying out the present disclosure will be described below. The exemplary embodiments illustrated below are merely examples, and for example, the configurations of the details of the exemplary embodiments can be appropriately changed by a person skilled in the art without departing from the spirit of the present disclosure. The numerical values adopted in the present exemplary embodiments are reference numerical values, and do not limit the present disclosure.

A robot apparatus according to a first exemplary embodiment is an industrial robot apparatus that performs assembly work. The robot apparatus has a function for examining the deterioration state of a transmission of the robot apparatus, particularly, detecting a failure and preventing a failure (a function capable of examining the state of the transmission of the robot apparatus). A "failure" in the present exemplary embodiment includes, in addition to an unusable state of the transmission, a normal-use-impossible state where the transmission cannot be used for a normal application. The "normal-use-impossible state" refers to, for example, the state where the transmission has gone beyond the acceptable range of a use condition required for a predetermined application (a normal-use-possible state).

As described above, generally, a transmission of a joint of a robot apparatus is often configured as a reduction gear due to the relationship between a number-of-revolutions range of a rotational driving source such as a servomotor and a number-of-revolutions range for rotating a link of the arm.

Thus, as a representative of a transmission used in a robot apparatus of this type, a reduction gear is exemplified.

In the present exemplary embodiment, through a resonance phenomenon that occurs in a joint portion of the robot apparatus, particularly the (deterioration) state of a reduction gear using a strain wave gearing mechanism is examined. The deterioration state of the transmission of the joint portion is detected through the resonance phenomenon in the joint portion of the robot apparatus based on the following principle.

If the reduction gear is damaged due to interference or collision as described above, tooth skipping or the biting of a small piece created by the damage causes an angle transmission error. The angle transmission error is, for example, the error between an input angle on the primary side of the reduction gear and an output angle obtained on the secondary side of the reduction gear via the transmission gear ratio.

Meanwhile, a joint of a robot with a reduction gear using strain wave gearing has a resonance frequency f (Hz: a natural frequency) represented by the following formula (1).

[Math. 1]

$$f = \frac{1}{2\pi}\sqrt{\frac{K}{J}} \qquad (1)$$

In formula (1), f is the resonance frequency (Hz: the natural frequency) of a vibration system including the reduction gear, K is the spring constant of the reduction gear, and J is the load inertia (Kgm2) of a load driven by the joint in which the reduction gear is provided. Among these values, the spring constant K is a constant term and is unique to each model of reduction gear. The load inertia J corresponds to the moment of inertia applied to a joint shaft which is a target, and the magnitude of the moment of inertia J changes according to the orientation of the robot arm.

Further, the reduction gear is a rotational driving system, and the resonance frequency f (Hz: the natural frequency) corresponds to the number of revolutions R (rpm: the number of revolutions per minute) in the following formula (2).

[Math. 2]

$$R = \frac{f}{2} * 60 \qquad (2)$$

Thus, when the rotational speed on the input side of the reduction gear reaches the number of revolutions R that satisfies formula (2), a resonance occurs in the joint. That is, if the joint is driven, speed unevenness that matches the resonance frequency f occurs near the number of driving revolutions in formula (2).

There is a relationship between the angle transmission error and the magnitude of the resonance of the reduction gear. For example, if a tooth piece of the reduction gear chipped by abrupt overload such as collision is periodically bitten into by other teeth, an angle transmission error occurs. If the angle transmission error matches the resonance frequency, the arm resonates more than in a normal state. Even if the gear is not damaged, but if (the entirety of) the reduction gear is distorted into oval shape, a wave generator, which is one of components included in the strain wave gearing mechanism of the reduction gear, periodically deforms and similarly resonates greatly.

Even when the gear is not damaged, if (the entirety of) the reduction gear is distorted into oval shape, the wave generator, which is one of the components included in the strain wave gearing mechanism of the reduction gear, periodically deforms. If the vibration system matches the resonance frequency in the state where this deformation occurs, the arm also resonates more than in a case where the arm resonates in the normal state.

As described above, a resonance phenomenon that occurs in a joint of a robot can be considered as the occurrence of the angle transmission error of a reduction gear in the form of the vibration of the joint that can be detected by an encoder or a current sensor. Thus, by measuring the intensity, e.g., the amplitude, of a resonance that occurs in (a reduction gear of) a joint of a robot arm and comparing this resonance amplitude with a reference value determined in advance as an index (guide) value according to the angle transmission error, it is possible to examine (or diagnose) the reduction gear.

Particularly, an output shaft encoder (or "output side encoder") can directly detect rotation unevenness on the output side of the reduction gear. Thus, it is desirable to utilize the output shaft encoder to make this diagnosis. Thus, in the present exemplary embodiment, an example is illustrated where the output shaft encoder is used. Alternatively, the rotation unevenness can also be detected using an input side encoder, a motor current value, a torque value, or an acceleration sensor.

When this examination (or diagnosis) is performed, the robot is most safe on an apparatus on a trajectory set in advance for a normal motion when the robot works on an apparatus. That is, since an obstacle is not present on a trajectory originally set for production, it can be said that it is basically safe on the trajectory unless another peripheral apparatus sticks out. By executing an examination motion that causes a resonance to occur while maintaining the trajectory determined in advance for the normal motion, it is possible to safely perform the examination on the apparatus.

Generally, in a robot, a plurality of joints often moves simultaneously, and the orientation of the robot changes moment by moment. Thus, the moment of inertia applied to each joint is not constant, and the resonance frequency of the joint also changes accordingly. To cause a resonance to occur while maintaining the same trajectory as that for a production motion, adjustments may be made to control the number of revolutions of a driving source of a target joint according to the resonance frequency that changes, while maintaining other joints on the defined production trajectory.

Figure 2:
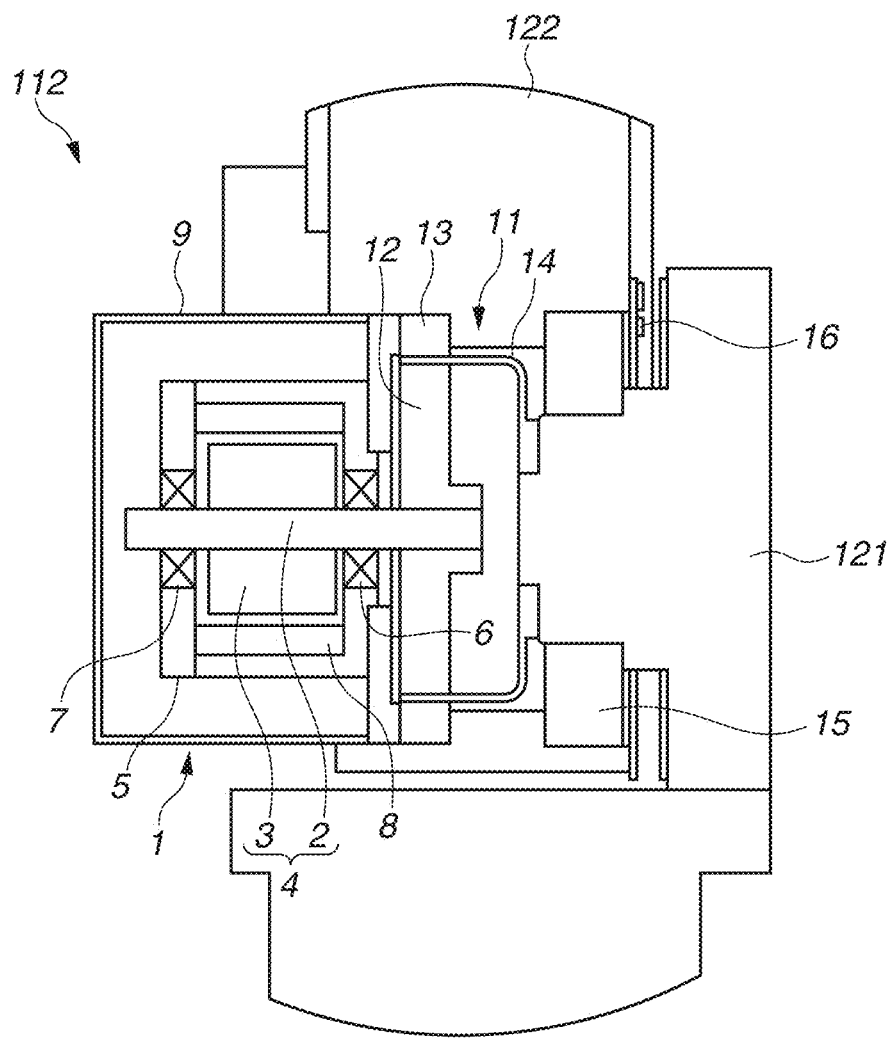
FIG. 2 is a cross-sectional view illustrating a configuration near a joint of the robot apparatus in FIG. 1.
Figure 3:
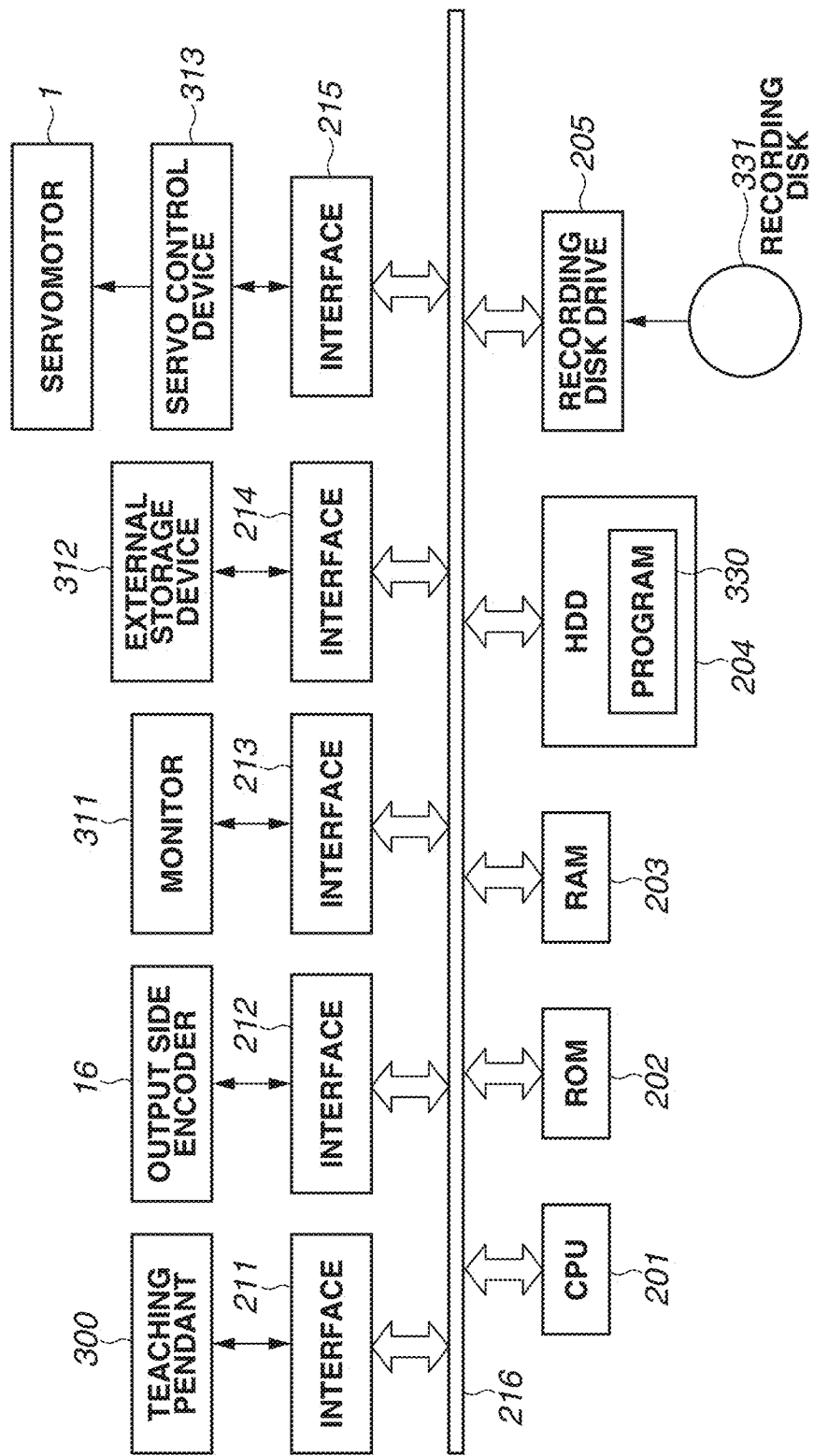
FIG. 3 is a block diagram illustrating a configuration of a control apparatus of the robot apparatus in FIG. 2.

FIGS. 1 to 3 illustrate an example of the configuration of a robot system 500 capable of carrying out the present disclosure. FIG. 1 schematically illustrates the overall configuration of the robot system 500. FIG. 2 illustrates a cross-sectional structure near one of joints of the robot system 500 in FIG. 1. FIG. 3 illustrates the configuration of a control apparatus 200 of the robot system 500 in FIG. 1.

As illustrated in FIG. 1, the robot system 500 includes a robot apparatus 100 that assembles a workpiece W, a control apparatus 200 that controls the robot apparatus 100, and a teaching pendant 300 connected to the control apparatus 200.

There is a case where a plurality of robot arms (e.g., 500A, 500B, and 500C) is installed at close positions and simultaneously operates in a manufacturing site.

Not only another robot arm but also another apparatus or another workpiece may be present near a robot arm as an examination target.

The robot apparatus 100 includes a six-axis multijoint robot arm 101, a hand (end effector) 102 connected to the end of the robot arm 101, and a force sensor (not illustrated) capable of detecting a force acting on the hand 102.

The robot arm 101 includes a base unit 103 (a base) fixed to a worktable, a plurality of links 121 to 126 that transmits displacement or a force, and a plurality of joints 111 to 116 that pivotably or rotatably couples the links 121 to 126. In the present exemplary embodiment, the configurations of the plurality of joints 111 to 116 are basically the same. Thus, in the following description, the configuration of the joint 112 between the links 121 and 122 will be described as a representative of the configurations common to the joints 111 to 116, and the other joints 111 and 113 to 116 will not be specifically described. The present exemplary embodiment can be carried out so long as a joint having the same configuration as that of the joint 112 is included in at least one of the plurality of joints 111 to 116 of the robot arm 101.

As illustrated in FIG. 2, the joint 112 includes a servomotor (motor) 1 as a rotational driving source and a reduction gear 11 (a transmission) that reduces (changes) the speed of the output of the servomotor 1. The rotational angle on the output side (the output side rotational angle) of the reduction gear 11 of the joint 112 is detected by an output side encoder 16 (a rotary encoder). Each of the output side encoder 16 and an input side encoder 10 has a configuration similar to that of a general rotary encoder and is an optical or magnetic rotary encoder device.

The servomotor 1 can be composed of an electromagnetic motor such as a brushless direct current (DC) motor or an alternating current (AC) servomotor. The servomotor 1 includes a rotation unit 4 composed of a rotating shaft 2 and a rotor magnet 3, a motor housing 5, bearings 6 and 7 that rotatably support the rotating shaft 2, and a stator coil 8 that rotates the rotation unit 4. The bearings 6 and 7 are provided in the motor housing 5, and the stator coil 8 is attached to the motor housing 5. The servomotor 1 is surrounded by a motor cover 9. In the servomotor 1, a brake unit for retaining the orientation of the robot arm 101 when the robot apparatus 100 is powered off may be provided, where necessary.

The reduction gear 11 includes a wave generator 12 as an input unit, a circular spline 13 as an output unit, and a flex spline 14 placed between the wave generator 12 and the circular spline 13. The wave generator 12 is connected to the other end side of the rotating shaft 2 of the servomotor 1. The circular spline 13 is connected to the link 122. The flex spline 14 is coupled to the link 121. That is, a joining portion of the rotating shaft 2 of the servomotor 1 and the wave generator 12 is the input side of the reduction gear 11, and a joining portion of the flex spline 14 and the link 121 is the output side of the reduction gear 11. The speed of the rotating shaft 2 of the servomotor 1 is reduced to 1/N (reduced at a reduction ratio N) via the reduction gear 11, and the links 121 and 122 rotate relative to each other. The rotational angle on the output side of the reduction gear 11 at this time is an actual output angle, i.e., the angle of the joint 112.

The output side encoder (output side angle sensor) 16 is provided on the output side of the reduction gear 11 and detects the relative angle between the links 121 and 122. Specifically, the output side encoder 16 generates an output side pulse signal according to the driving of the joint 112 (the relative movement of the links 121 and 122) and outputs the generated output side pulse signal to the control apparatus 200. A cross roller bearing 15 is provided between the links 121 and 122, and the links 121 and 122 are rotatably coupled together via the cross roller bearing 15.

In the rotating shaft 2 of the servomotor 1, i.e., on the input side of the reduction gear 11, an input side encoder (input side angle sensor) 10 can be placed.

The hand 102 includes a plurality of fingers capable of holding the workpiece W, and an actuator (not illustrated) that drives the plurality of fingers. The hand 102 is configured to hold the workpiece W by driving the plurality of fingers. The force sensor detects a force or a moment acting on the hand 102 when the hand 102 holds the workpiece W with the plurality of fingers.

As illustrated in FIG. 3, the control apparatus 200 includes a central processing unit (CPU) (arithmetic unit) 201, a read-only memory (ROM) 202, a random-access memory (RAM) 203, a hard disk drive (HDD) (storage unit) 204, a recording disk drive 205, and various interfaces 211 to 215.

The CPU 201 is connected to the ROM 202, the RAM 203, the HDD 204, the recording disk drive 205, and the various interfaces 211 to 215 via a bus 216. The ROM 202 stores a basic program such as Basic Input/Output System (BIOS). The RAM 203 composes a storage area that temporarily stores the arithmetic processing result of the CPU 201.

The HDD 204 is a storage unit that stores various types of data such as the arithmetic processing result of the CPU 201 and also records a control program 330 (e.g., including an examination program) for causing the CPU 201 to execute various types of arithmetic processing. The CPU 201 executes various types of arithmetic processing based on the control program 330 recorded (stored) in the HDD 204. The recording disk drive 205 can read various types of data and a program recorded in a recording disk 331.

Particularly, the control program 330 corresponding to a control procedure to be executed by a computer (the CPU 201) is stored in, for example, the HDD 204 (or the ROM 202) in FIG. 3. A storage unit such as the ROM 202 or the HDD 204 is a computer-readable recording medium. (A part of) the computer-readable recording medium such as the ROM 202 or the HDD 204 may be an attachable and detachable flash memory device, magnetic disk, or optical disc. Alternatively, a configuration may be employed in which the program corresponding to the control procedure to be executed by the computer (the CPU 201) is downloaded via a network and installed on, for example, the HDD 204 or is obtained by updating software already installed on the HDD 204.

The interface 211 is connected to the teaching pendant 300 operated by a user. In the teaching pendant 300, a user interface including a display device such as a liquid crystal display (LCD) panel and a keyboard is provided. Using this user interface, the user can perform a teaching operation on the robot apparatus 100. This enables the user to, for example, specify the position and orientation of a reference point (a teaching point) set at the end of the robot arm 101 or specify the joint angles of the joints 111 to 116. The teaching pendant 300 outputs thus input target joint angles of the joints 111 to 116 to the CPU 201 via the interface 211 and the bus 216.

The interface 212 is connected to the output side encoder 16 of each of the joints 111 to 116 of the robot arm 101. As described above, the output side encoder 16 outputs a pulse signal corresponding to the joint angle to the CPU 201 via the interface 212 and the bus 216. The interfaces 213 and 214 can be connected to a monitor 311 and an external storage device 312 (a rewritable non-volatile memory or an external HDD), respectively. The monitor 311 is a display device such as an LCD panel. The monitor 311 can be used to display the control state of the robot apparatus 100 and can also be used to display information or a warning message related to an examination process.

The interface 215 is connected to a servo control device 313. The CPU 201 outputs data of a driving command indicating the control amount of the rotational angle of the rotating shaft 2 of the servomotor 1 to the servo control device 313 via the bus 216 and the interface 215 at predetermined intervals.

Based on the driving command received from the CPU 201, the servo control device 313 calculates the amount of current to be output to the servomotor 1 of each of the joints 111 to 116 of the robot arm 101. The servo control device 313 supplies a current corresponding to the obtained current value to the servomotor 1. This controls the joint angles of the joints 111 to 116 of the robot arm 101. That is, via the servo control device 313, the CPU 201 can control the servomotor 1 to drive each of the joints 111 to 116 so that the joints 111 to 116 are at target joint angles.

Figure 4:
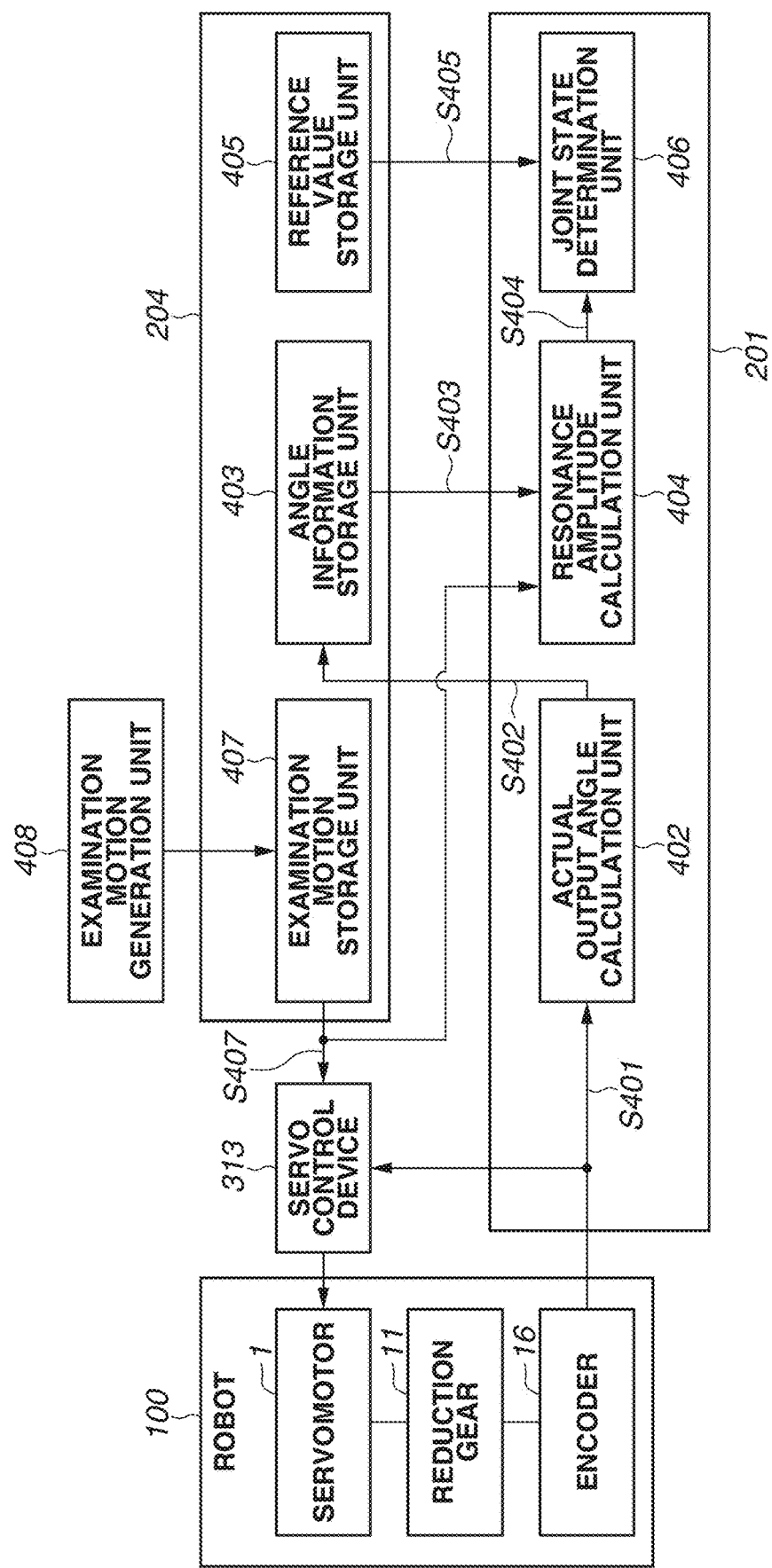
FIG. 4 is a block diagram illustrating a functional configuration of the control apparatus of the robot apparatus in FIG. 2.

With reference to FIG. 4, a description will be given of functions executed by the control apparatus 200 when an examination program (e.g., FIG. 5) according to the present exemplary embodiment is executed. Functional blocks in FIG. 4 are implemented by the hardware and software of the computer (the CPU 201). Particularly, this software portion is stored in a computer-readable recording medium such as the ROM 202 or the HDD 204.

A functional configuration in FIG. 4 includes an actual output angle calculation unit 402, a resonance amplitude calculation unit 404 that calculates an angle transmission error due to a resonance from a rotational angle, and a joint state determination unit 406. Further, the functional configuration in FIG. 4 includes a reference value storage unit 405 that stores an amplitude reference value for examining the reduction gear 11 of each joint, an angle information storage unit 403 that stores and accumulates an output side rotational angle detected by the output side encoder 16, an examination motion storage unit 407 that stores an examination motion, and an examination motion generation unit 408 that generates an examination motion.

The actual output angle calculation unit 402 counts an output side pulse signal (s401) received from the output side encoder 16, thereby obtaining an output side rotational angle (s402). Then, the actual output angle calculation unit 402 outputs the output side rotational angle (s402) to the servo control device 313 and the angle information storage unit 403. Based on examination motion information s407 stored in the examination motion storage unit 407, the servo control device 313 controls the joint angle of the servomotor 1 while referencing the actual output angle information (s402) output from the actual output angle calculation unit 402.

The actual output angle calculation unit 402, the resonance amplitude calculation unit 404, the joint state determination unit 406, and the examination motion generation unit 408 are achieved by a CPU that operates according to a program for executing the present exemplary embodiment. The present disclosure, however, is not limited to this. Alternatively, these units may be achieved by individual pieces of hardware.

The examination motion information s407 defines an examination motion to be performed when the joint is examined. The examination motion information s407 is generated by the examination motion generation unit 408 based on trajectory data determined in advance for a normal motion and is stored in the examination motion storage unit 407. Since the characteristics represented by formulas (1) and (2) differ according to the joint (111 to 116), the content of the examination motion information s407 differs according to the joint (111 to 116) to be examined. Particularly, the examination motion information s407 is used to generate examination motion data for driving the examination target joint at a driving speed that causes the examination target joint to resonate, and causing the examination target joint to pass through a path based on the trajectory data. The examination motion data is adjusted to correspond to the natural frequency of the examination target joint that changes according to the orientation of the robot arm 101, maintain the rotational speed on the input side of the reduction gear 11 at certain times the natural frequency, and maintain the same trajectory as a trajectory for the normal motion based on the trajectory data serving as a reference. Such an examination motion enables a safe examination on the apparatus.

The angle information storage unit 403 accumulates the angle information (s402) output from the actual output angle calculation unit 402. The reference value storage unit 405 stores a reference value s405 required for a determination and outputs the reference value s405 to the joint state determination unit 406. The resonance amplitude calculation unit 404 reads accumulated angle information s403 from the angle information storage unit 403, calculates a determination value A (s404) required for an examination, and outputs the determination value A to the joint state determination unit 406. The joint state determination unit 406 compares the reference value s405 output from the reference value storage unit 405 with the determination value A (s404) calculated by the resonance amplitude calculation unit 404, thereby determining the joint state of the robot.

The angle information storage unit 403, the reference value storage unit 405, and the examination motion storage unit 407 are all stored in the HDD 204, but may be stored in another storage device such as the RAM 203.

Figure 5:
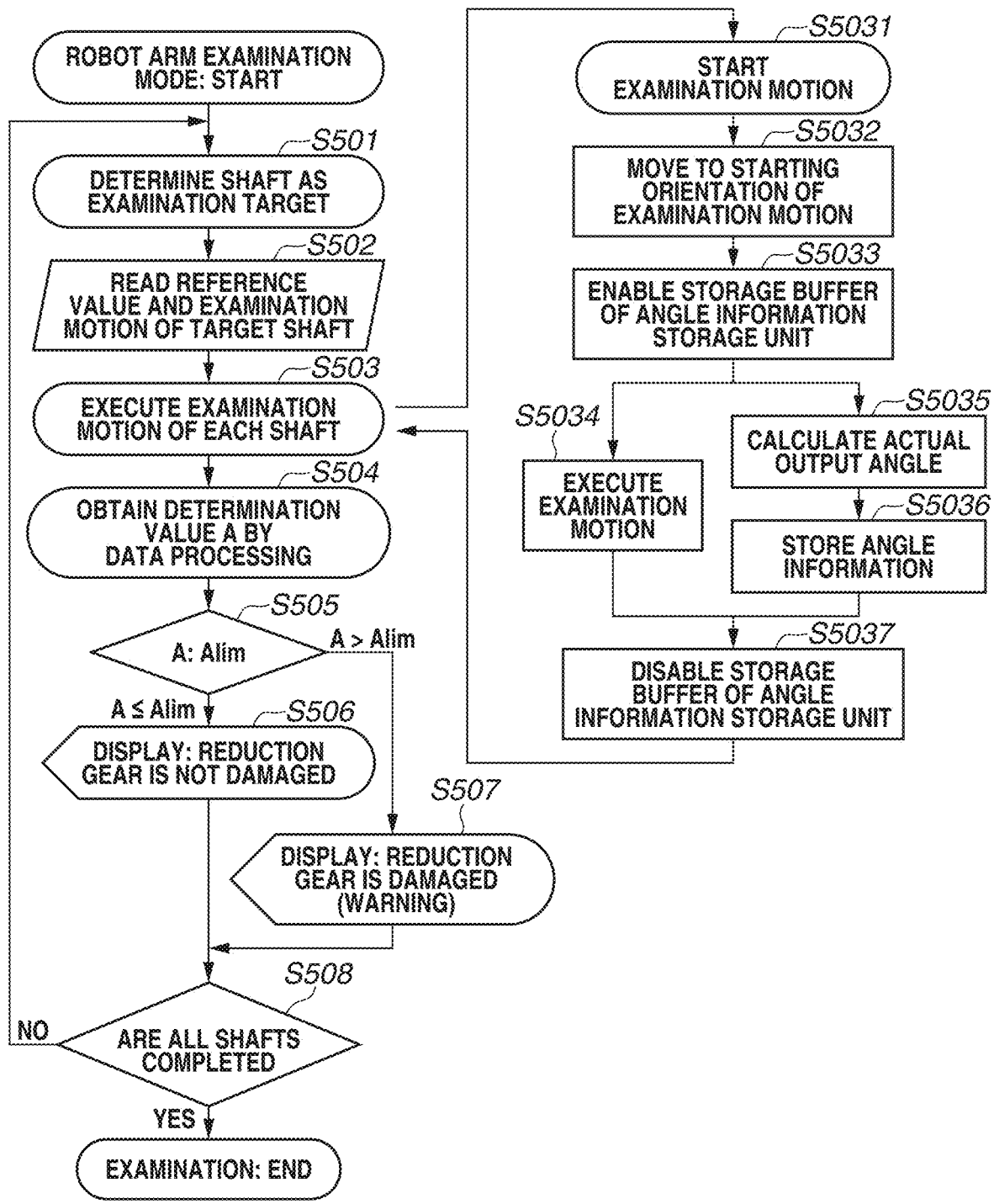
FIG. 5 is a flowchart illustrating a control procedure regarding an examination of the robot apparatus in FIG. 1.

Next, with reference to FIG. 5, a description is given of an examination process for examining the joints (111 to 116) that is performed in the above configuration. FIG. 5 illustrates the flow of an examination process (an examination mode) for examining the joints (111 to 116) according to the present exemplary embodiment that is executed by control of the control apparatus 200, particularly the CPU 201, in the above configuration.

In the present exemplary embodiment, as described above, using a resonance phenomenon that occurs at a frequency centered on a resonance frequency corresponding to the natural frequency of a target joint in an orientation according to a production motion, the state of the joint is examined.

The examination process (the examination mode) in FIG. 5 is performed when the robot is subjected to a periodic examination or after an unintended event such as interference or collision occurs. As a trigger for executing the examination process (the examination mode) in FIG. 5, an operation in which an operator selects the examination mode using the user interface in the teaching pendant 300 is possible.

The examination process (the examination mode) in FIG. 5 is performed with respect to each shaft among the joints (111 to 116). If the operator (the user) selects the examination process (the examination mode), then in step S501 in FIG. 5, a shaft to be examined is determined. A configuration is employed in which the examination process (the examination mode) in FIG. 5 is executed on all the shafts (all the joints), starting from a particular shaft (joint). Alternatively, control may be performed so that the examination process (the examination mode) in FIG. 5 is executed on only a single shaft or on only one or more shafts specified by the operator (the user). Normally, it is desirable to examine all the shafts (all the joints). The order of joints to be examined may be in order from the closest joint to the base unit 103, or the user may specify any order.

Next, in step S502, the reference value s405 of the examination shaft and the examination motion information s407 regarding the examination target shaft are read from the reference value storage unit 405 and the examination motion storage unit 407, respectively. The reference value storage unit 405 and the examination motion storage unit 407 can be placed in the form of a data file in the HDD 204, for example. The reference value s405 and the examination motion information s407 differ according to the joint (111 to 116) to be examined. This is because, for example, the characteristics represented by formulas (1) and (2) differ according to the joint (111 to 116). Thus, the reference value s405 and the examination motion information s407 are prepared with respect to each shaft (joint) in the reference value storage unit 405 and the examination motion storage unit 407, respectively. Then, at the stage when the examination is executed, information corresponding to the joint is individually read into a work area such as the RAM 203. Alternatively, at the stage when the examination mode is selected, the reference values and the examination motions of all the shafts may be read into a work area such as the RAM 203 at a time.

In step S503, the examination motion of the joint is performed. That is, the servo control device 313 drives the examination target shaft according to the examination motion information s407 read in step S502. At this time, the pulse value (s401) acquired from the output side encoder 16 every certain period is counted by the actual output angle calculation unit 402, and a value obtained by converting the pulse value (s401) into the actual output angle information (s402) is stored and accumulated in the angle information storage unit 403.

The processing of the examination motion in step S503 is illustrated in detail as steps S5031 to S037 in the right column of FIG. 5. Steps S5031 to S037 included in step S503 will be described in detail.

If the examination motion is started in step S5031, then in step S5032, first, based on the examination motion information s407 read in step S502, the servo control device 313 moves the robot arm 101 to a starting orientation.

Next, in step S5033, to store and accumulate the actual output angle information (s402), the angle information storage unit 403 is enabled, thereby enabling a storage buffer for storing the actual output angle information (s402) output from the actual output angle calculation unit 402.

Next, in step S5034, the servo control device 313 drives the target joint in a particular motion pattern according to the examination motion information s407 read in step S502. During this time, in step S5035, the pulse value (s401) obtained from the output side encoder 16 is sequentially converted into the actual output angle information (s402) by the actual output angle calculation unit 402. In step S5036, the actual output angle information (s402) is stored and accumulated in the angle information storage unit 403.

If the examination motion is completed, then in step S5037, the storage buffer of the angle information storage unit 403 is closed, and the shaft output angle information (s402) is saved. It is desirable that the intervals at which the pulse value (s401) is read from the output side encoder 16 should be an acquisition period that matches the control period of the servo control device 313.

In step S504, the actual output angle information (s402) accumulated in the angle information storage unit 403 in step S503 is processed, and a vibration amplitude at an angle due to a resonance is calculated as the determination value s404 (A).

Steps S505 and S506 correspond to an examination step of examining the state of the reduction gear 11. First, in step S505, the determination value A (s404) calculated in step S504 is compared with the reference value Alim (s405) read in step S502. If the determination value A (s404) exceeds the reference value Alim (s405), it is determined that the reduction gear 11 of the examination shaft is damaged. According to this determination result, in step S506, a message "the reduction gear is not damaged" is output, or in step S507, a message "the reduction gear is damaged" (a warning message) is output. For example, these examination messages may be output using the monitor 311 or the display of the teaching pendant 300 or output as a sound using a sound output unit (not illustrated).

If step S505 is completed, then in step S508, it is confirmed whether a joint (a shaft) that has not yet been examined is left. If a joint (a shaft) that has not yet been examined is left (NO in step S508), the processing returns to step S501. In step S501, a process similar to the above is repeated, and all examination target joints (shafts) are examined.

As described above, it is possible to perform the examination process (the examination mode) in FIG. 5 for each joint. In the examination process (the examination mode) in FIG. 5, a resonance amplitude acquisition step is performed for each particular examination target joint. The examination motion information s407 used at this time defines an examination motion adjusted to correspond to the natural frequency of the target joint, maintain the rotational speed on the input side of the reduction gear 11 at certain times the natural frequency, and maintain the same trajectory as a production trajectory as a reference. The natural frequency of the joint can be calculated in advance by formula (1), and the rotational speed of the input shaft of the reduction gear 11 at this time can be determined in advance by formula (2).

Thus, by performing the examination process (the examination mode) in FIG. 5 for each joint, it is possible to obtain the determination value A of the resonance amplitude of the joint. The determination value A of the resonance amplitude can be calculated as, for example, the maximum value of the amplitudes of frequency components centered on the resonance frequency. Then, by comparing the determination value A with the reference value Alim (s405) set for each joint similarly to the examination motion information s407, it is possible to examine the joint, e.g., examine whether the joint is damaged (or reaches the end of its life). It is possible to notify the user of the examination result by outputting a display message (or a sound message). For example, these messages can be output as display using the monitor 311 or the display of the teaching pendant 300 or output as a sound using a sound output unit (not illustrated).

The outline of the examination process (the examination mode) according to the present exemplary embodiment is as illustrated in FIG. 5. The details of robot control performed in the above examination process (the examination mode) will be further described below.

The present exemplary embodiment is characterized in that in an examination motion defined for each joint by the examination motion information s407, the motion of causing a joint as an examination target to resonate while maintaining a predetermined trajectory determined in advance for normal work is performed. The examination motion information s407 is generated by the examination motion generation unit 408 based on trajectory data determined in advance and is stored in the examination motion storage unit 407.

The user of the robot selects at least one of production motions for each joint and sets the selected production motion as an examination motion. At this time, to cause a resonance to certainly occur, it is desirable to select a motion in which an examination target joint moves relatively greatly. Specifically, the user may select a motion in which the input shaft of the reduction gear 11 of the target joint rotates three or more revolutions.

As is clear from formulas (1) and (2), the phase of a resonance to be caused to occur in a joint portion of a robot when an examination is performed is influenced by two factors, namely the orientation of a robot arm and the motion speed (the driving speed) of a joint. If the orientation of the robot arm 101 changes, the magnitude of the load inertia changes according to formula (1). Thus, to perform an examination using a resonance phenomenon while maintaining a defined production trajectory, a target joint moves at a driving speed according to the change in speed defined by formula (2).

With reference to FIGS. 6A to 6F, the generation of an examination motion based on a production motion will be specifically described. A case is considered where the moment of inertia J of a target joint gradually increases according to the orientation of the robot. This is easy to understood, for example, by imagining the second joint of the arm horizontally extended as indicated by a solid line from a state indicated by a dotted line in FIG. 6A. The moment of inertia J applied to the second joint at this time can be calculated from the orientation of the robot and the weights of components as a general mechanics problem, and changes as in FIG. 6B according to the change in the orientation.

At this time, by formula (1), the resonance frequency of the target joint changes with the change in the orientation as in FIG. 6C. To cause the joint to resonate, the rotational speed of the driving source may be set so that the shaft on the input side of the reduction gear 11 driven by the driving source rotates at a rotational speed obtained by multiplying this resonance frequency by a constant. It is desirable that this multiple should be ½ times the resonance frequency. This is because the flex spline 14 and the circular spline 13 of the reduction gear 11 are in contact with each other at two points. That is, the teeth of the flex spline 14 pass through a damaged portion twice per revolution of the wave generator 12. Thus, if the rotational speed of the input shaft of the reduction gear 11 is ½ times the resonance frequency, the frequency of a vibration to occur matches the resonance frequency of the target joint. By formula (2), the rotational speed of the input shaft of the reduction gear 11 is as illustrated in FIG. 6D. This can determine the rotational speed of the driving source according to the orientation of the target joint. The determined rotational speed is set as a speed command value.

Next, to move to a specified point in an examination motion while maintaining the determined rotational speed of the driving source, a position command value is adjusted in a time direction. As the adjustment method, for example, as in FIG. 6E, there is a method for multiplying the time direction of the speed command value by a magnification so that the amount of rotation of the driving source of the target joint in a production motion as a reference matches the amount of rotation of the driving source of the target joint in the examination motion, thereby stretching or shortening the time of the position command value. By the above processing, the motion of only the target joint is determined.

Next, based on the determined motion of the target joint, the motions of the other joints are adjusted so as to maintain a trajectory in the production motion. As the adjustment method, for example, as in FIG. 6F, there is a method for searching angle information regarding each shaft in the examination motion and angle information regarding each shaft in the production motion as the basis, for a point where the angle of the target examination joint in the examination motion match the angle of the target examination joint in the production motion, and setting the joint angles at this time to the respective joints.

The thus generated examination motion information s407 has the same trajectory as that for the production motion and can cause the target joint to resonate. Thus, by causing the robot to move based on the examination motion information s407, it is possible to safely examine the state of the reduction gear on the apparatus. Further, by generating the examination motion information s407 for all the shafts using this method, it is possible to examine all the joints provided in the robot on the apparatus.

The examination orientation exemplified in FIG. 6A and the examination sequence (the examination motion) illustrated in FIG. 5 can be described by the examination motion information s407, and is stored in the examination motion storage unit 407.

Figure 7:
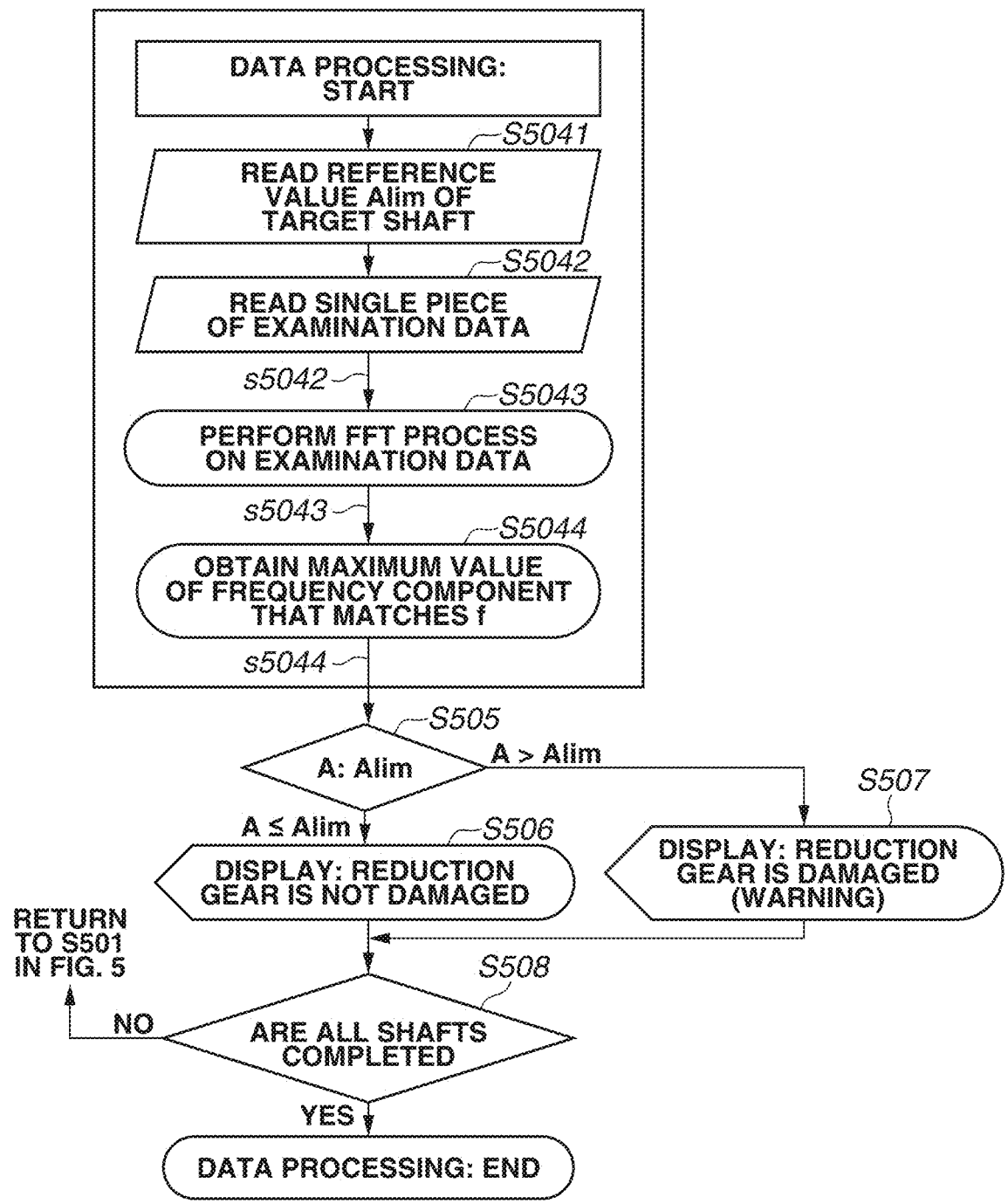
FIG. 7 is a flowchart illustrating a calculation procedure for calculating a determination value from a vibration examination result in the examination of the robot apparatus in FIG. 1.

Next, with reference to FIG. 7, a detailed description will be given of an example of the configuration of the process for calculating an angle transmission error due to a resonance from the actual output angle information (s402) accumulated in the angle information storage unit 403 in step S504 in FIG. 5. FIG. 7 illustrates an example of specific processing in step S504 and onward in the left column of FIG. 5, and step S504 includes steps S5041 to S5044.

In step S5042, a single piece of data is read from the actual output angle information (s402) accumulated in the angle information storage unit 403 and is output to the resonance amplitude calculation unit 404.

Next, in step S5043, an unnecessary component is excluded from the read actual output angle information (s402). That is, since the actual output angle information (s402) includes a vibration component due to resonance superimposed on the examination motion itself, only a resonance component needs to be extracted from the actual output angle information (s402). As the method for extracting the resonance component, there is a method for performing a fast Fourier transform (FFT) process for converting examination data from a time domain to a frequency domain.

Figure 8A:
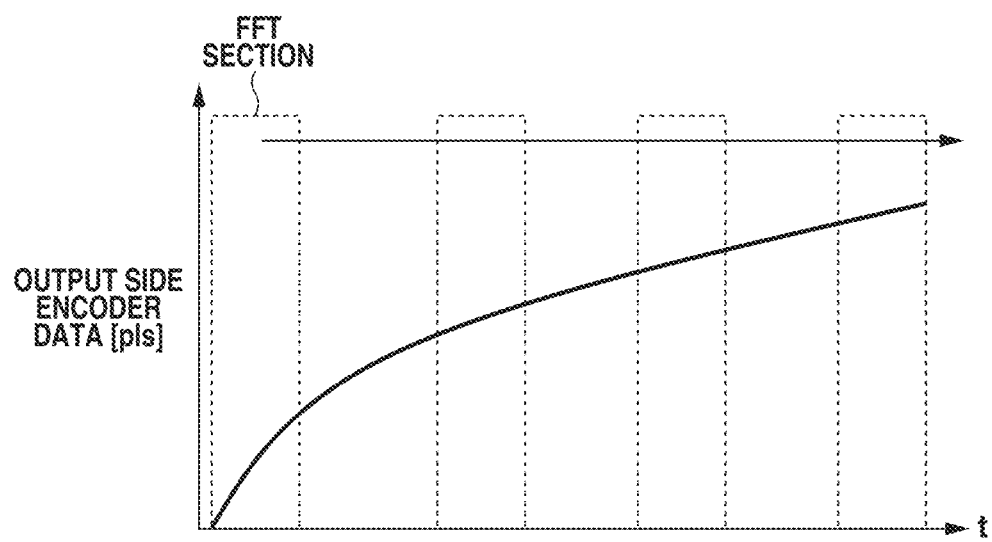
FIGS. 8A and 8B are diagrams illustrating a method of a fast Fourier transform (FFT) process for generating the determination value in an examination process (an examination mode) of the robot apparatus in FIG. 1.
Figure 8B:
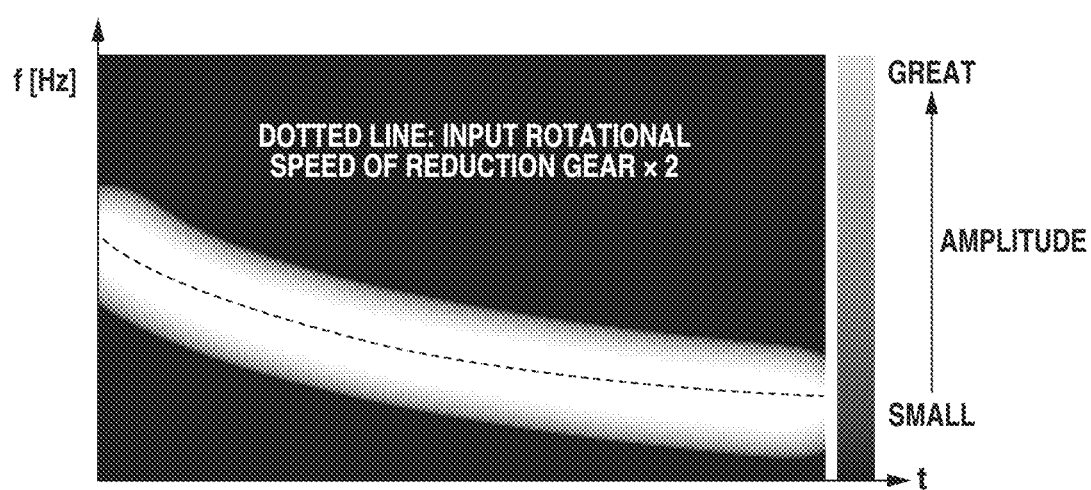

With reference to FIGS. 8A and 8B, the FFT process will be further described. As in FIG. 8A, a certain FFT section is provided, and the FFT process is performed while shifting the section little by little from the beginning of the read actual angle information (s402). This can accurately detect the vibration of the robot that changes according to the change in the orientation of the robot. It is desirable that the section at this time should be wider than or equal to the degree that a target frequency component can be acquired. For example, if attention is paid to 10 Hz, the time section is set to be wider than 100 msec. It is desirable to minimize the shifting width of the section in the range where the shifting width can be set. The thus obtained FFT result (s5043) is output as an amplitude value with respect to a time t and a frequency f. In FIG. 8B, the amplitude value is represented as a color map.

Next, in step S5044, the determination value A is obtained from the FFT result. From the FFT result (s5043) output in step S5043, the maximum value of a component that matches a value twice the rotational speed of the input shaft of the reduction gear 11 of the target joint in the examination motion (i.e., the resonance frequency of the joint calculated by formula (1)) is detected and set as the determination value A of the resonance amplitude. The rotational speed of the input shaft of the reduction gear 11 of the target joint in the examination motion can be obtained from the examination motion information s407.

The processes of step S505 and onward in FIG. 7 are similar to those described in FIG. 5. In these steps, the determination value A of the resonance amplitude calculated as described above and the reference value Alim (s405) are compared with each other, and a notification or a warning message is output according to the result of the comparison. Regarding the reference value Alim (s405) used in the determination in step S505, since a value detected by the output side encoder 16 is angle information, for example, an angle error accepted as a reference value (an acceptable value) of the angle information can be used as the reference value Alim (s405). Specifically, the specification value of the angle transmission error of the reduction gear 11 can be used as the reference value Alim (s405). There is a case where a value published in the catalog specifications of the reduction gear 11 can be used as the specification value of such an angle transmission error. In this case, by using the value published in the catalog or adding or subtracting an appropriate margin to or from the published value, it is possible to determine the reference value Alim (s405) to be actually used for the joint.

There is a case where the type of the reduction gear 11 differs for each joint. Thus, the reference value Alim (s405) also needs to be prepared for each joint. In step S5041 in FIG. 8, as a matter of course, the reference value Alim (s405) prepared for the joint as the examination target is read from the reference value storage unit 405. As the reference value Alim (s405), in addition to the above specification value of the angle transmission error, a position deviation required for the target joint may be calculated from the required positional accuracy of the end of the robot arm 101 and used.

As described above, according to the present exemplary embodiment, examination motion data that causes a joint to resonate while maintaining a predetermined production trajectory is generated. By causing a robot to move based on this data, acquiring the resonance amplitude of the joint, and using the acquired resonance amplitude to determine a failure, it is possible to examine a robot system while avoiding collision with an object placed near the robot system. This achieves the effect of quickly determining, on an apparatus, whether to replace a component of a robot apparatus. Further, according to the resonance amplitude of a joint measured by an output side angle sensor for measuring the rotational angle of a rotating shaft on the output side of a transmission (a reduction gear), it is possible to quickly determine the state of the transmission placed in the joint of a robot apparatus with high accuracy.

In the above description, a configuration is illustrated in which a resonance amplitude measured by the current examination process (examination mode) is compared with a reference value, whereby the state of a transmission (a reduction gear) is examined with respect to each examination process (examination mode). Alternatively, the state of the transmission (the reduction gear) can also be examined using the state of change (e.g., the rate of change) from a resonance amplitude acquired by the examination process in the past and the resonance amplitude acquired by the current examination process. To this end, for example, a configuration is employed in which a resonance amplitude measured by the examination process (the examination mode) is accumulated in a database placed in the HDD 204. Then, the rate of change in the resonance amplitude is calculated from the resonance amplitude of the joint acquired by the current examination process (examination mode) and the resonance amplitude acquired by the examination process in the past, and the state of the transmission is examined based on the calculated rate of change. For example, the following examination can be performed. A threshold for the rate of change is determined in advance, and if the rate of change in the resonance amplitude that exceeds the threshold (e.g., is steep) is detected, it is determined that the transmission is damaged or the end of its life has been reached, and needs to be replaced. In the first exemplary embodiment, as a trajectory in which a robot is caused to move when an examination is performed, a trajectory registered in advance for manufacturing is used. A second exemplary embodiment, however, is not limited to this.

In diagnosis according to the present exemplary embodiment, to identify which joint a damaged reduction gear belongs to, it is desirable to stop joints other than an examination target joint and cause only the target joint to move. Thus, to diagnose all the joints, an examination motion is executed for each joint.

However, similarly to the first exemplary embodiment, as a trajectory in which a robot is caused to move when an examination is performed, a trajectory registered in advance for manufacturing may be used.

In this case, similarly to the first exemplary embodiment, when a robot in which a failure occurs is examined in a manufacturing site, it is possible to prevent the robot from interfering with another apparatus near the robot.

With reference to the exemplary embodiment illustrated in FIGS. 9 to 16, the measurement and the diagnosis of a joint of a robot apparatus are specifically described based on the above principle. In the present exemplary embodiment, an example of diagnosis using an output side encoder is illustrated.

Figure 9:
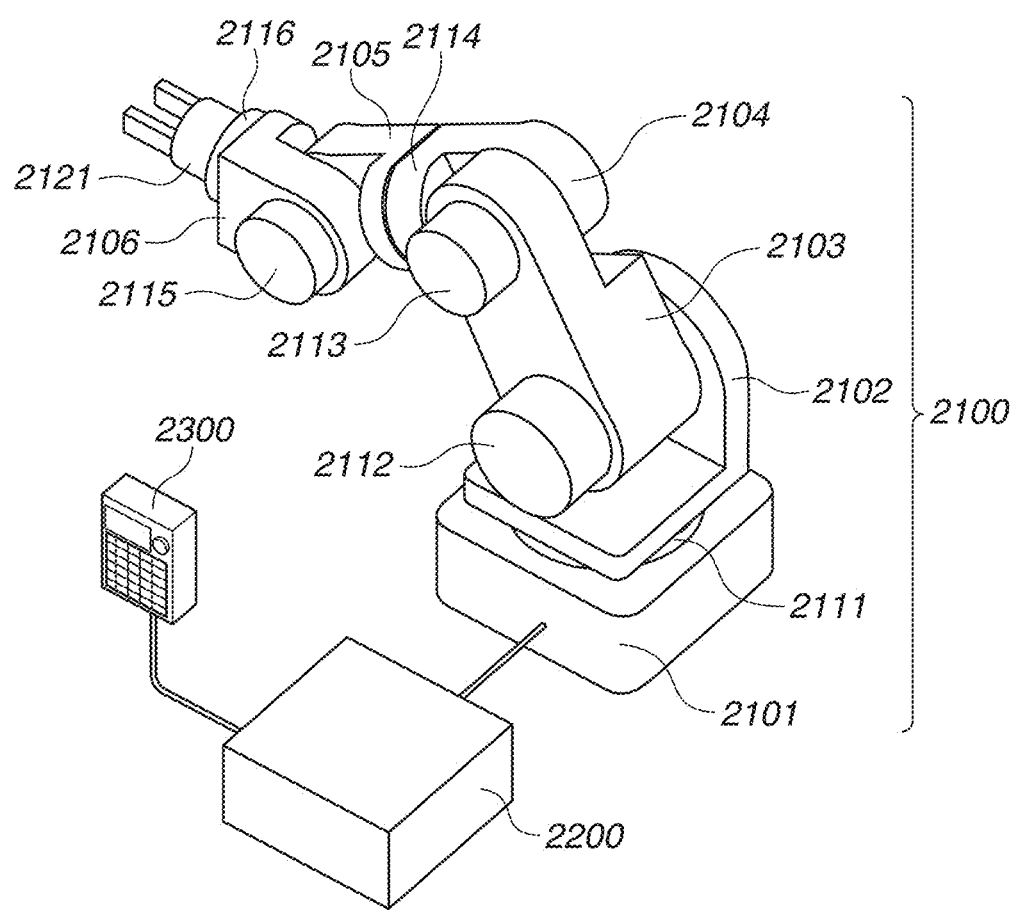
FIG. 9 is a diagram illustrating a six-axis robot system.
Figure 10:
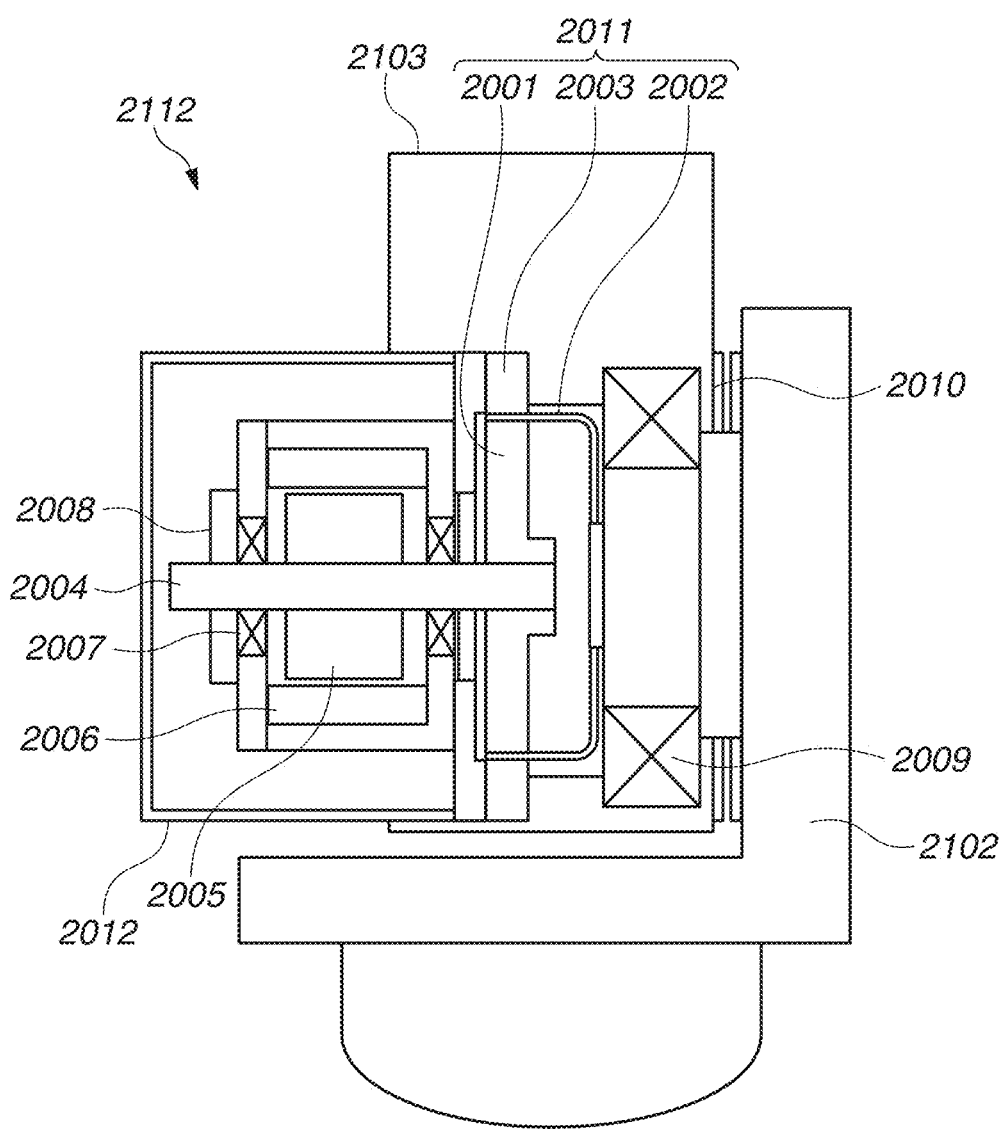
FIG. 10 is a diagram illustrating a joint structure of the six-axis robot.
Figure 11:
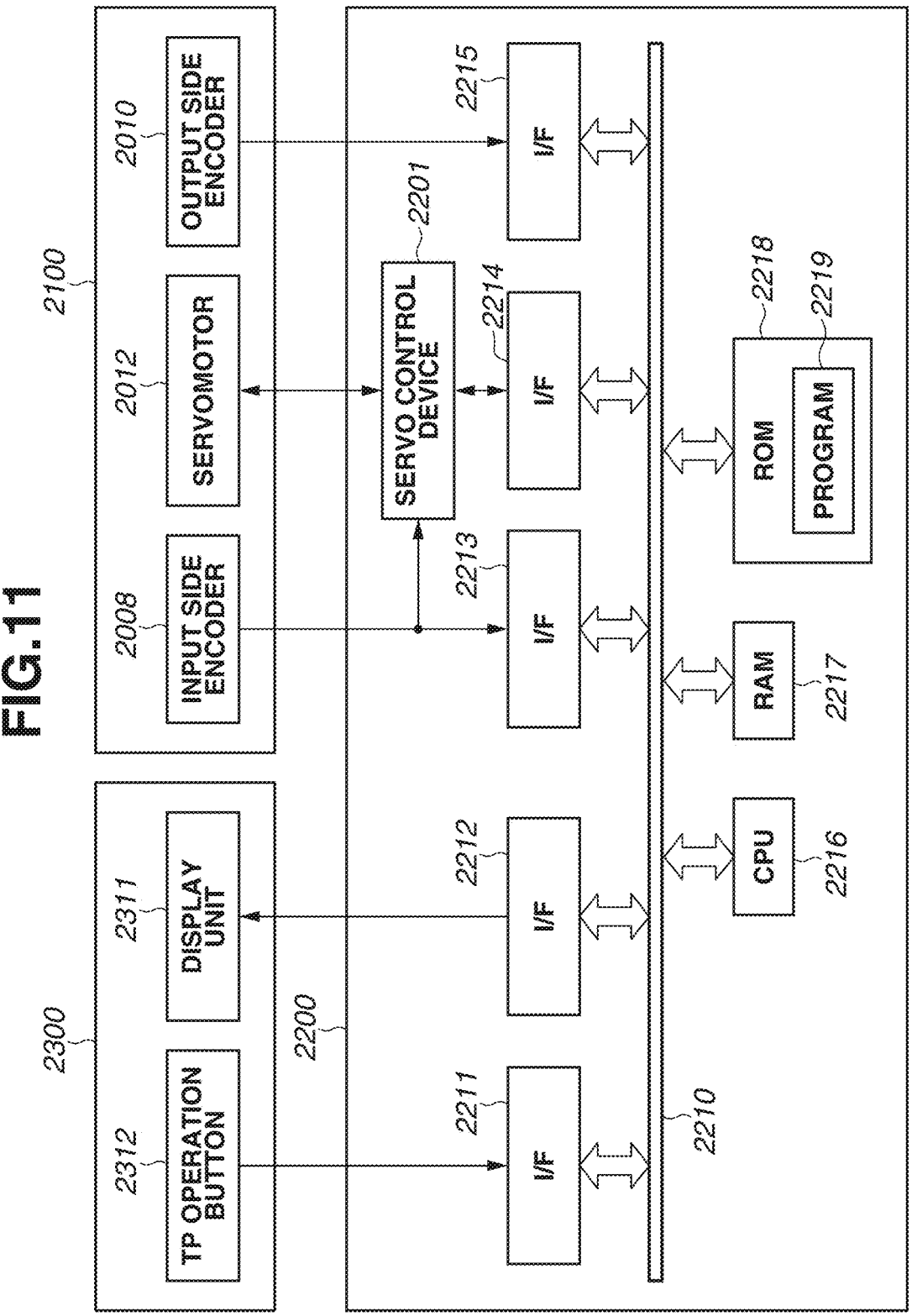
FIG. 11 is a diagram illustrating an internal configuration of a controller.

FIGS. 9 to 11 illustrate an example of the configuration of a robot system capable of carrying out the present exemplary embodiment. FIG. 9 schematically illustrates the overall configuration of the robot system. FIG. 10 illustrates a cross-sectional structure near one of joints of the robot system in FIG. 9. FIG. 11 illustrates the configuration of a control apparatus 2200 of the robot system in FIG. 9.

As illustrated in FIG. 9, the robot system includes a robot apparatus 2100 that assembles or manufactures a workpiece W, a control apparatus 2200 that controls the robot apparatus 2100, and a teaching pendant 2300 connected to the control apparatus 2200.

A robot arm includes a base unit 2101 (a base) fixed to a worktable, a plurality of links 2102 to 2107 that transmits displacement or a force, and a plurality of joints 2111 to 2116 that pivotably or rotatably couples the links 2102 to 2107. In the present exemplary embodiment, the configurations of the plurality of joints 2111 to 2116 are basically the same. Thus, in the following description, the configuration of the joint 2112 between the links 2102 and 2103 will be described as representative of the configurations common to the joints 2111 to 2116, and the other joints 2111 and 2113 to 2116 will not be specifically described. The present exemplary embodiment can be carried out so long as a joint having the same configuration as that of the joint 2112 is included in at least one of the plurality of joints 2111 to 2116 of the robot arm.

By causing this robot system to operate and executing a control method described below, it is possible to contribute to a stable operation of the robot system and also efficiently manufacture an article using the robot system.

As illustrated in FIG. 10, the joint 2112 includes a servomotor (motor) 212 as a rotational driving source and a reduction gear 2011 (a transmission) that reduces (changes) the speed of the output of the servomotor 2112. The joint 2112 also includes an input side encoder 2008 as an input side angle sensor that detects the rotational angle of a motor shaft 2004 of a servomotor 2012. The rotational angle on the output side (the output side rotational angle) of the reduction gear 2011 of the joint 2112 is detected by an output side encoder 2010 (a rotary encoder) as an output side angle sensor. The input side encoder 2008 and the output side encoder 2010 has a configuration similar to that of a general rotary encoder and is composed of an optical or magnetic rotary encoder device.

The servomotor 2012 can be an electromagnetic motor such as a brushless DC motor or an AC servomotor. In the servomotor 2012, a brake unit for retaining the orientation of the robot arm when the robot apparatus 2100 is powered off may be provided, where necessary.

The reduction gear 2011 includes a wave generator 2001 as an input unit, a circular spline 2003 as an output unit, and a flex spline 2002 placed between the wave generator 2001 and the circular spline 2003. The wave generator 2001 is connected to the other end side of the rotating shaft 2004 of the servomotor 2012. The circular spline 2003 is connected to the link 2103. The flex spline 2002 is coupled to the link 2102. That is, a joining portion of the rotating shaft 2004 of the servomotor 2012 and the wave generator 2001 is the input side of the reduction gear 2011, and a joining portion of the flex spline 2002 and the link 2103 is the output side of the reduction gear 2011. The speed of the rotating shaft 2004 of the servomotor 2012 is reduced to 1/N (reduced at a reduction ratio N) via the reduction gear 2011, and the links 2102 and 2103 rotate relative to each other. The rotational angle on the output side of the reduction gear 2011 at this time is an actual output angle, i.e., the angle of the joint 2112.

The output side encoder (the output side angle sensor) 2010 is provided on the output side of the reduction gear 2011 and detects the relative angle between the links 2102 and 2103. Specifically, the output side encoder 2010 generates an output side pulse signal according to the driving of the joint 2112 (the relative movement of the links 2102 and 2103) and outputs the generated output side pulse signal to the control apparatus 2200. A cross roller bearing 2009 is provided between the links 2102 and 2103, and the links 2102 and 2103 are rotatably coupled together via the cross roller bearing 2009.

FIG. 11 is an internal block diagram of the robot system centered on the control apparatus 2200. The control apparatus 2200 is a portable or stationary computer. The control apparatus 2200 includes a communication bus 2210 within, and in the control apparatus 2200, a CPU 2216 for various calculation processes, a RAM 2217, and a ROM 2218 that stores a control program 2219 are connected to the communication bus 2210 through communication. As the control program 2219, not only a program for controlling the entire robot system, but also a program to be read and executed by the CPU 2216, thereby enabling an examination illustrated below is also stored. The input side encoder 2008, the output side encoder 2010, and the servomotor 2012 of the robot 2100, and an operation button 2312 and a display unit 2311 of the teaching pendant 2300 are connected through communication via interfaces (I/Fs) (2211 to 2215).

A medium for storing the control program 2219 is not limited to the ROM 2218, and may be a recording medium such as a hard disk, a semiconductor memory, an optical disc, or a magneto-optical disc.

A configuration is employed in which the user inputs an instruction through the TP operation button 2312, the program 2219 is called in response to the instruction, and the servomotor 2012 of the robot 2100 is controlled via a servo control device 2201. At this time, the CPU 2216 also functions as a driving control unit for controlling the servo control device 2201 and controlling the driving of the motor.

Next, with reference to FIGS. 12A to 16, description will be given of the configuration and the flow when diagnosis is made.

FIGS. 12A to 12D are diagrams illustrating a diagnosis mode user interface (UI) through which the user makes diagnosis settings when diagnosis is made. The UI is displayed on the display unit 2311 of the teaching pendant 2300. If a "diagnosis" button on a screen in FIG. 12A is pressed, the robot system shifts to a diagnosis mode, and a screen in FIG. 12B for making diagnosis settings is displayed on the display unit 2311. On this screen, the user can select a shaft, the reduction gear 2011 of which the user wishes to diagnose. By pressing a start button, the diagnosis of the selected shaft is started.

If the diagnosis is completed, a diagnosis result screen for the diagnosis result of each joint in FIG. 12C is displayed on the display unit 2311. On this screen, a percentage to a predetermined reference value is displayed in the center column, and if the percentage is less than or equal to 100%, the determination that there is no abnormality (OK) is displayed in the right column, and if the percentage exceeds 100%, the determination that there is an abnormality (NG) is displayed in the right column, so that the diagnosis result of each shaft can be seen. Further, if a "reference history" button on the screen for making diagnosis settings is pressed, changes in the diagnosis results in the past are displayed on a graph screen in FIG. 12D so that the tendency of the diagnosis result of each shaft can be seen at a glance.

Figure 13:
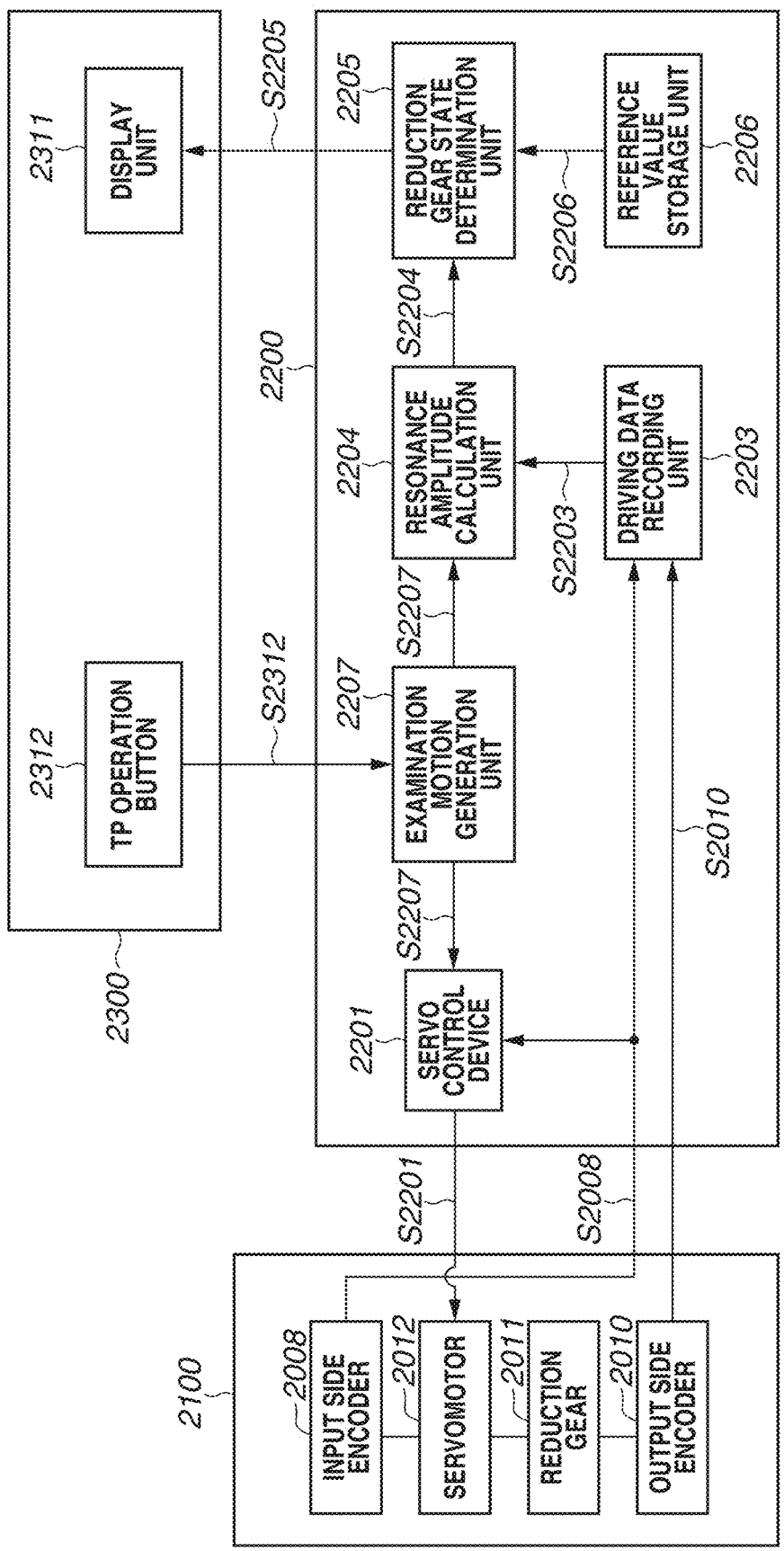
FIG. 13 is a diagram illustrating a configuration of a diagnosis function.

FIG. 13 is a diagram illustrating the flow of data when diagnosis is made. In FIG. 13, rectangles in the control apparatus 2200 represent various control units illustrating in a hardware manner the functions executed by the CPU 2216, or actual hardware.

In response to an input S2312 from the TP operation button 2312, the diagnosis mode is started. Then, if a joint to be diagnosed is selected, an examination motion generation unit 2207 generates an examination motion according to the joint or reads an already generated examination motion, and outputs the examination motion to the servo control device 2201 and a resonance amplitude calculation unit 2204 (S2207). The examination motion information S2207 is output to the resonance amplitude calculation unit 2204 at this time because the examination motion information S2207 will be used in data processing by the resonance amplitude calculation unit 2204. Based on the output examination motion information S2207, the servo control device 2201 controls a current S2201, thereby driving the servomotor 2012. At this time, input side angle information S2008 detected by the input side encoder 2008 that detects the rotational position of the motor shaft 2004, and output side angle information S2010 regarding the reduction gear 2011 detected by the output side encoder 2010 are periodically output to a driving data recording unit 2203. To accurately record the resonance amplitude of the robot, it is desirable that each of the time intervals of the periodical output should be less than or equal to approximately ten times the resonance frequency. For example, if the resonance frequency is 20 Hz, each of the intervals is less than or equal to 200 Hz=5 msec period.

If the examination motion is completed, the driving data recording unit 2203 outputs the recorded series of pieces of angle information S2008 and S2010 as examination data S2203 to the resonance amplitude calculation unit 2204. The resonance amplitude calculation unit 2204 obtains a determination value A from the obtained examination data S2203 and the examination motion information S2207 and outputs the determination value A to a reduction gear state determination unit 2205 (S2204). The reduction gear state determination unit 2205 compares a reference value S2206 read from a reference value storage unit 2206 with the determination value A (S2204), diagnoses the state of the reduction gear 2011, and displays a diagnosis result S2205 on the display unit 2311 of the teaching pendant 2300.

Figure 14:
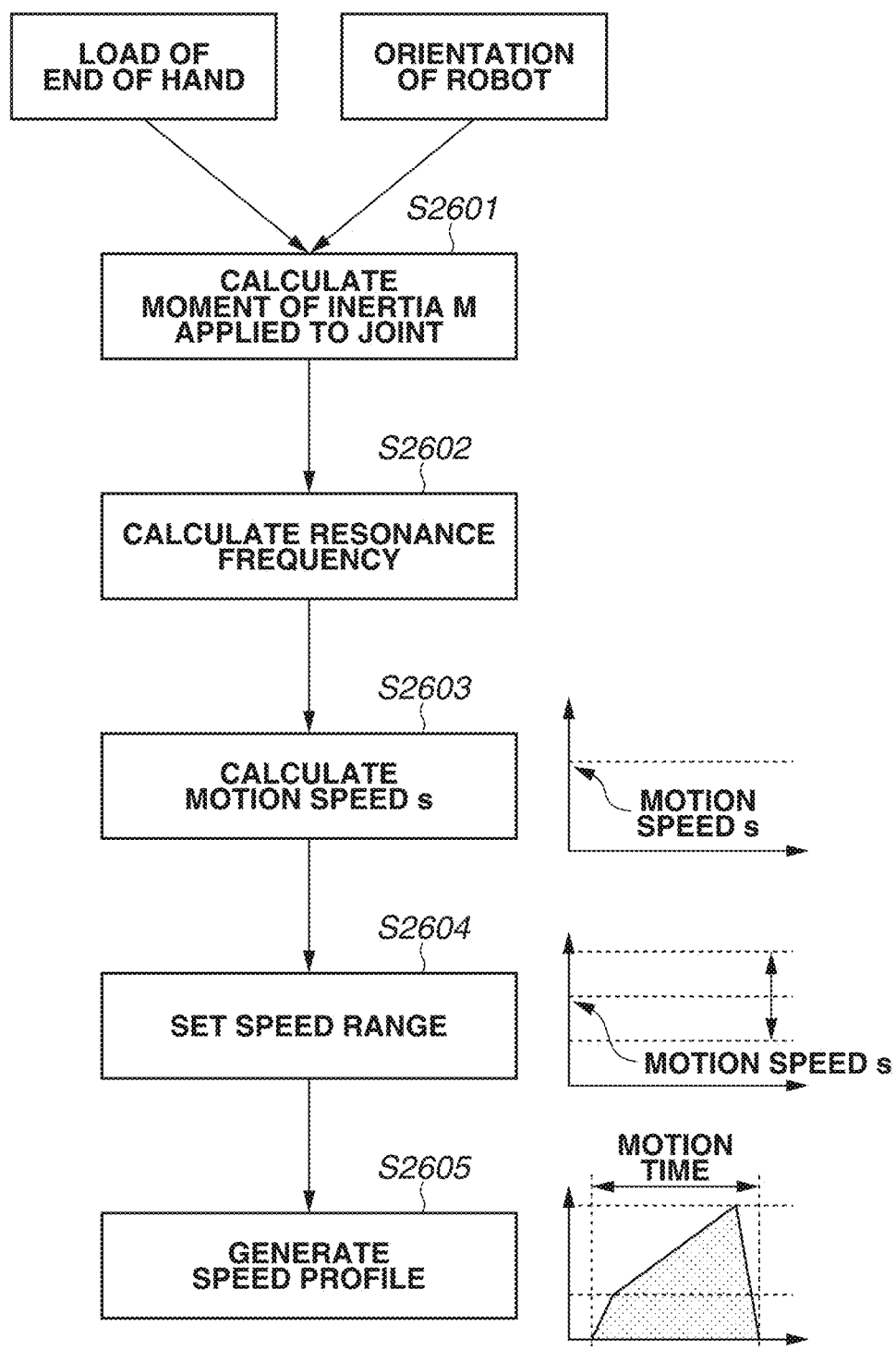
FIG. 14 is a diagram illustrating a generation method for generating an examination motion.

FIG. 14 is a diagram illustrating a generation method for generating an examination motion for sweeping a speed range. In step S2601, to obtain a resonance frequency f, the moment of inertia m applied to a target joint is calculated. The resonance frequency f of the robot changes according to the load or the orientation of a hand portion attached to the end of the hand of the robot. Thus, the moment of inertia m is calculated based on the load and the orientation. Next, in step S2602, using the obtained moment of inertia m, the resonance frequency f of the target joint is calculated by formula (1). Alternatively, the resonance frequency f may be obtained in advance by experiment under the same conditions.

Next, in step S2603, the number of revolutions R on the input side of the reduction gear 2011 of the target joint that matches ½ or the integer multiple of the resonance frequency f obtained in step S2602 is calculated, and a motion speed s of the joint according to the number of revolutions R is obtained. At this time, it is desirable that the number of revolutions R on the input side of the reduction gear 2011 should be a value that matches ½ of the resonance frequency f. This derives from the structure of a strain wave reduction gear. That is, since the flex spline 2002 and the circular spline 2003 are in contact with each other at two points, two vibrations occur per revolution of the flex spline 2002. This is because the number of revolutions corresponding to a ratio of 1:1 between the resonance frequency f and vibration by the reduction gear 2011, i.e., a ratio of 2:1 between the resonance frequency f and the number of revolutions on the input side of the reduction gear 2011, causes a resonance phenomenon to occur most greatly and therefore is easy to measure.

In step S2604, a speed range is set. It is desirable to set this speed range under the condition that the speed range includes the motion speed s of the joint obtained in step S2603, and in a range capable of covering variations due to the individual difference or the state of the joint. As the width of this range, a width centered on the motion speed s and determined in advance in the apparatus may be applied. In step S2605, a motion speed profile for changing the motion speed s of the joint over time to cover the speed range set in step S2604 is set. At this time, it is necessary to adjust the motion time so that the range of movement of the target joint does not go beyond its acceptable range. To certainly measure a resonance, it is desirable to make the change in speed as gradual as possible. Thus, it is desirable to take as long a time as possible for the motion time. In the present exemplary embodiment, the profile linearly changes from the low speed side to the high speed side of the speed range. Alternatively, the profile may change from the high speed side to the low speed side, or may not linearly change. For example, the profile may non-linearly change such that the change in speed is slow near the joint speed s. Alternatively, the speed may change step by step discontinuously with respect to each certain time that is a somewhat short time. That is, it is desirable that the period when the speed can change without the robot arm stopping while the robot arm is moved should exist.

Thus generated examination motion includes the joint speed s that causes the target joint to resonate, and can cover a range including variations due to the individual difference or the state of the joint by a single motion.

In the description of the present exemplary embodiment, the motion speed s of the joint when the joint is moved with the number of revolutions R on the input side of the reduction gear 2011, and the speed range including the motion speed s as a condition for the examination are set. Alternatively, instead of the speed, another parameter may be defined. For example, the number of revolutions per unit time of a rotary motor or the reduction gear 2011 may be defined, or the rotational angle per unit time of the joint may be defined. That is, the joint may be driven while changing the driving parameter over time such that a motion range includes a driving condition that causes the joint to resonate and a condition that can be read for a driving parameter and under which the joint resonates.

Figure 15:
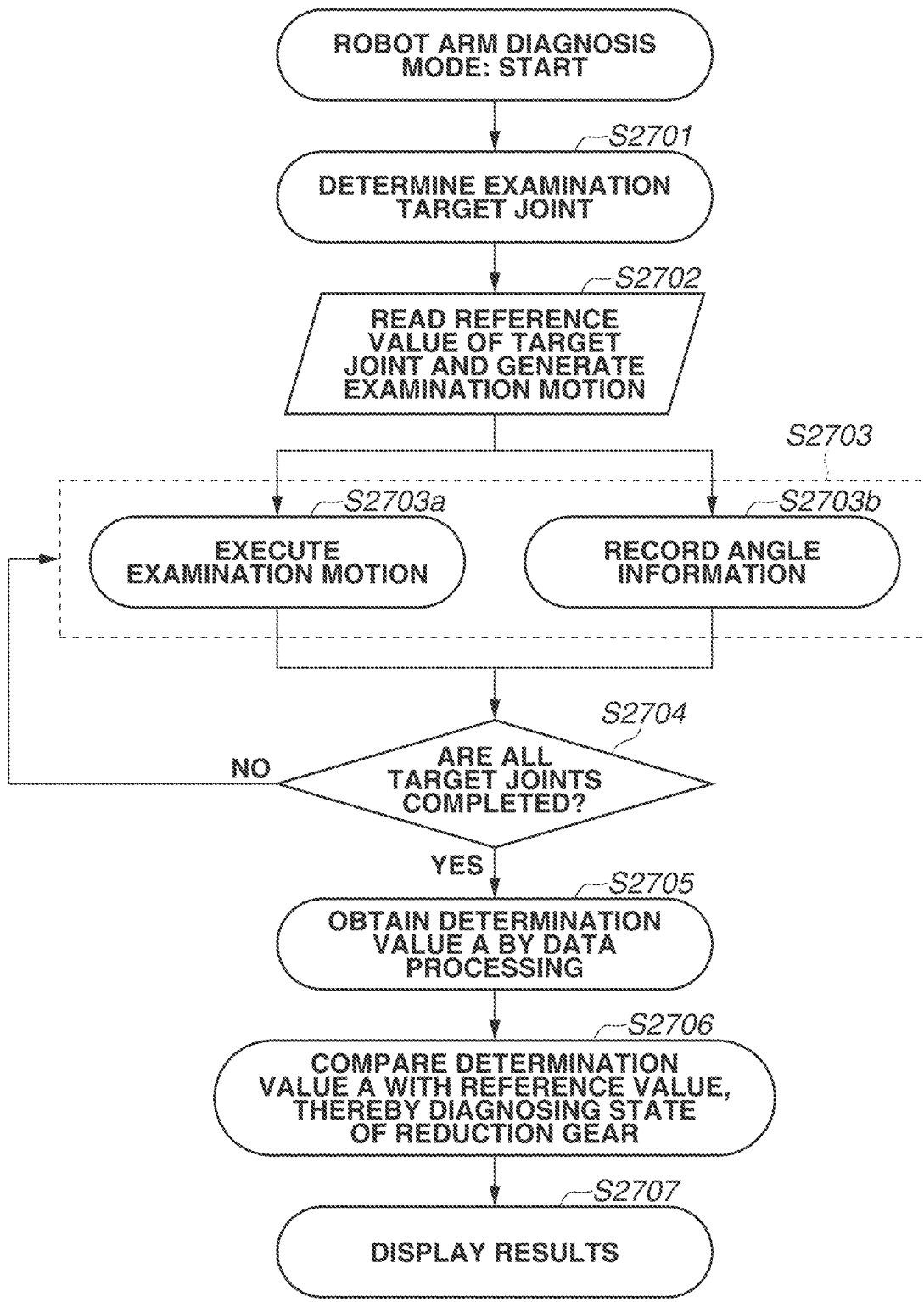
FIG. 15 is a diagram illustrating a diagnosis flow.

FIG. 15 is a diagram illustrating the flow in which a measurement is made using a generated examination motion.

When diagnosis is made, the "diagnosis" button is pressed on the UI screen in FIG. 12A, whereby the robot enters the diagnosis mode. In step S2701, using the UI screen in FIG. 12B, the user specifies a joint to be diagnosed. In step S2702, the reference value S2206 of the joint selected in step S2701 is read, and an examination motion is also generated for each joint according to the flow in FIG. 14. Alternatively, if an already generated motion is stored, the already generated motion may be read.

Next, in step S2703, in parallel with the execution of the read motion (step S2703*a*), the angle value S2008 of the input side encoder 2008 and the angle value S2010 of the output side encoder 2010 in the middle of driving the joint while changing the driving parameter over time are recorded in the driving data recording unit 2203 (step S2703*b*). In step S2704, it is determined whether an examination target joint is left. If an examination target joint is left (NO in step S2704), the processing returns to step S2703. In step S2703, similarly, the execution of the examination motion and the recording of the angle information are repeated. If the examination motions of all the target joints are completed (YES in step S2704), then in step S2705, data processing described below is performed, thereby obtaining the determination value A. In step S2706, the determination value A calculated in step S2705 and the reference value S2206 are compared with each other, thereby diagnosing the state of the reduction gear 2011. Finally, in step S2707, the diagnosis results are displayed as in FIG. 12C, and the diagnosis mode ends.

Figure 16:
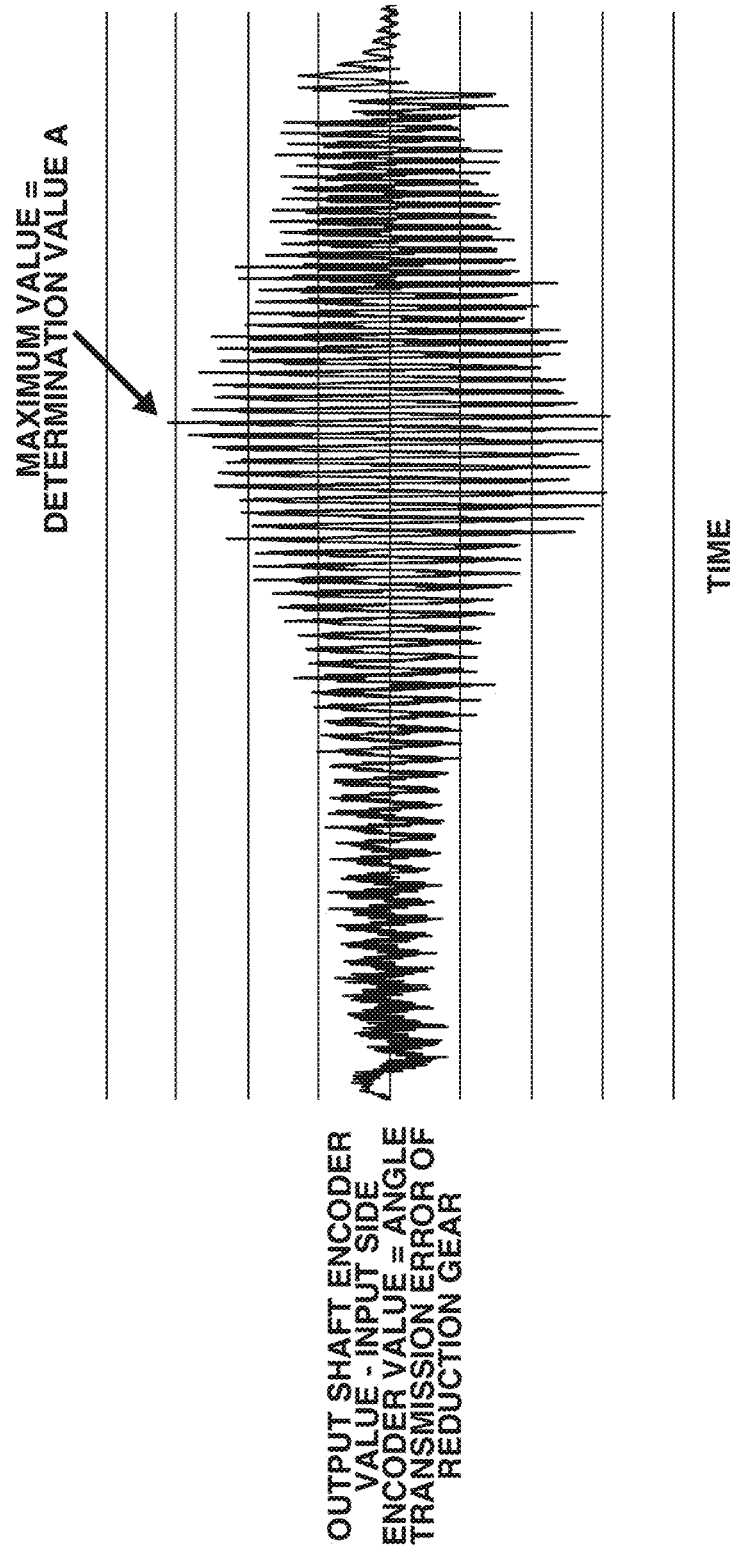
FIG. 16 is a diagram illustrating a data processing method for calculating a determination value.

FIG. 16 is a diagram illustrating a method in which the CPU 2216 calculates and acquires the determination value A as the maximum value of a vibration amplitude in step S2705.

The resonance amplitude calculation unit 2204 calculates the determination value A from the examination data S2203 (i.e., the difference between the angle information S2008 regarding the input side encoder 2008 and the angle information S2010 regarding the output side encoder 2010) sent from the driving data recording unit 2203.

By subtracting the angle information S2008 regarding the input shaft from the series of pieces of angle information S2010 regarding the output shaft obtained by causing the target joint to move according to the created speed profile, it is possible to acquire a resonance amplitude as the angle transmission error of the reduction gear 2011 (FIG. 16). Based on the diagnosis principle, an angle transmission error due to a resonance can be regarded as proportional to the magnitude of damage that occurs in the reduction gear 2011. The speed profile includes a speed that causes the examination target joint to resonate most. Thus, it is possible to forcibly cause an angle transmission error to appear in a vibration amplitude using a resonance, and at the same time, deal with a change in resonance speed due to the individual difference of the robot or the state of the joint. Thus, the greater of the positive maximum value and the negative maximum value among the calculated angle transmission errors (an arrow portion in FIG. 16), i.e., the maximum value of the vibration amplitude, is set as the determination value A.

Thus obtained determination value A and the corresponding reference value S2206 are compared with each other by the reduction gear state determination unit 2205. For example, there is a method for using the specification value described as the catalog value of the reduction gear 2011, as the reference value to be compared with the determination value A. That is, if the determination value A exceeds the specification value set by the manufacturer of the reduction gear 2011, it is determined that an abnormality occurs. Alternatively, a position deviation required for the target joint may be calculated from the required positional accuracy of the end of the robot arm and used as the reference value.

As described above, according to the present exemplary embodiment, regardless of variations due to the individual difference of a robot or the state of a joint, it is possible to diagnose the state of a reduction gear by a minimum of a single examination motion with respect to each joint. Thus, it is possible to shorten the diagnosis time.

When an examination is performed, a change over time in a single motion does not need to be performed throughout all values between the minimum value and the maximum value to which each joint can change.

For example, the values between the minimum value and the maximum value to which each joint can change may be divided into two or three groups, and the joint may be examined by two or three examinations throughout all the groups between the minimum value and the maximum value to which the joint can change.

Consequently, even when the range of a parameter to be used for an examination is wide, only several examination motions need to be performed. Thus, it is possible to execute an examination without spending too much examination time.

Alternatively, each joint may not be examined throughout all values between the minimum value and the maximum value of a parameter to which the joint can change, and the joint may be examined by including a parameter that will be used in manufacturing.

For example, if the angle of the output shaft is used only from 50 degrees to 100 degrees in an actual manufacturing motion, an examination may be performed in a range including at least 50 to 100 degrees.

Consequently, it is possible to execute an examination without spending too much examination time.

As described above, the range of a parameter to be changed over time in a single motion in an examination may be appropriately changed according to the purpose of the examination.

Then, as described at the beginning of the present exemplary embodiment, as in the first exemplary embodiment, an examination may be executed such that the trajectory of the robot arm maintains a trajectory for a normal motion.

For example, while the parameter of the examination target joint may be changed over time during a single motion, the other joints may be caused to move by maintaining the movement path of the arm in the normal motion to follow this single motion.

Consequently, for example, it is possible to examine a robot while preventing the robot from interfering with a robot arm or an obstacle near the robot.

In the above exemplary embodiments, the method using the output side encoder to examine the state of the reduction gear more accurately is illustrated. Alternatively, also using an encoder attached to a motor shaft or a current sensor that acquires a motor driving current, it is possible to perform the examination according to this technique.

In the above exemplary embodiments, the driving speed is determined based on the resonance frequency. Alternatively, the trajectory for the examination may be generated in the range where the resonance frequency has some range, and the driving speed also has some range. The trajectory does not need to be determined based on the exact value of the resonance frequency so long as a certain level of resonance state occurs, and a failure can be examined, although the amplitude width itself of the resonance is somewhat smaller.

The examination method for examining the robot apparatus illustrated in the above exemplary embodiments can be applied to, for example, various robot systems (robot apparatuses) used to manufacture various articles (industrial products). The configuration of each robot system (robot apparatus) such as the configuration of a robot arm is optional. Thus, any robot system (robot apparatus) including a joint joining two or more links can perform the examination method according to the present disclosure. By examining the joint of the robot system using the examination method according to the present disclosure, it is possible to certainly examine and confirm the state (the presence or absence of a failure or damage) of a transmission of the joint and maintain the joint (the transmission) in an appropriate state. Thus, using the robot system, it is possible to manufacture a target article with high accuracy and high yield.

More generally, the examination method for examining the robot apparatus illustrated in the above exemplary embodiments can also be more generally regarded as an examination method for examining a rotational driving apparatus including a rotational driving source (motor) and a transmission. In this case, the examination method for examining the rotational driving apparatus according to the present disclosure exemplified in the above exemplary embodiments can be performed as an examination method for examining a rotational driving apparatus including various rotational driving sources (motors) and transmissions by various mechanical apparatuses.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. An information processing method for acquiring information about a robot including joints and a reduction gear, the information processing method comprising:
    displaying the joints on a display unit such that a predetermined joint of the joints is selectable, and diagnosing whether an abnormality occurs to a predetermined reduction gear included in the selected predetermined joint; and
    displaying history of diagnosis results of the predetermined reduction gear on the display unit.

2. The information processing method according to claim 1, wherein a button to start diagnosis of the reduction gear included in the predetermined joint is displayed on the display unit.

3. The information processing method according to claim 1, wherein a button to stop diagnosis of the reduction gear included in the predetermined joint is displayed on the display unit.

4. The information processing method according to claim 1, wherein a button to make a setting in acquiring the information about the robot is displayed on the display unit, and a first screen on which the joints are displayed such that the joints are selectable is displayed in a case where the fourth button is selected.

5. The information processing method according to claim 1, wherein history of past diagnosis of the predetermined reduction gear corresponding to the selected joint is displayed as the history.

6. The information processing method according to claim 1, wherein transition of diagnosis results of the predetermined reduction gear included in the predetermined joint is displayed in a graph as the history on the display unit.

7. The information processing method according to claim 6, wherein a graph corresponding to all reduction gears is displayed on the display unit.

8. The information processing method according to claim 1, wherein a button to select all of the joints is displayed on the display unit.

9. The information processing method according to claim 1, wherein a result of comparing a threshold is displayed in percentage as a diagnosis result.

10. The information processing method according to claim 9, wherein the threshold is a specification value described in a catalogue of the predetermined reduction gear corresponding to the selected joint.

11. The information processing method according to claim 9, wherein the threshold is a value set based on positional accuracy of the robot.

12. The information processing method according to claim 1, wherein information about whether the predetermined reduction gear corresponding to the selected joint is normal or abnormal is displayed as a diagnosis result.

13. The information processing method according to claim 12, wherein the predetermined reduction gear corresponding to the selected joint that is abnormal is displayed with emphasis.

14. The information processing method according to claim 1, wherein in a case where the predetermined reduction gear included in the selected predetermined joint is diagnosed, the selected joint is operated within a range including an operation parameter in which a strongest characteristic vibration in the selected joint is generated.

15. The information processing method according to claim 14, wherein the operation parameter is continuously changed.

16. The information processing method according to claim 14, wherein in a case where the predetermined reduction gear included in the selected predetermined joint is diagnosed, the selected joint is operated not to exceed a movable range of the selected joint.

17. The information processing method according to claim 14, wherein the range corresponds to the characteristic vibration that is changed according to a change of an orientation of the selected joint.

18. The information processing method according to claim 14, wherein a speed is set as the operation parameter and the range is set so that the range includes a speed of an integer multiple of a characteristic vibration frequency of the selected joint so that the strongest characteristic vibration in the selected joint is generated.

19. The information processing method according to claim 15, wherein a speed is set as the operation parameter and the range is set so that the range includes a speed of ½ of a characteristic vibration frequency of the selected joint so that the strongest characteristic vibration in the selected joint is generated.

20. The information processing method according to claim 1,
wherein a first angle sensor configured to acquire information about an angle of an output side of the reduction gear and a second angle sensor configured to acquire information about an angle of an input side of the reduction gear are disposed on each of the joints, and
wherein the reduction gear is diagnosed based on the first angle sensor and the second angle sensor.

21. The information processing method according to claim 20, wherein an amplitude is acquired based on the first angle sensor and the second angle sensor, and the reduction gear is diagnosed.

22. The information processing method according to claim 21, wherein the amplitude is an angle transmission error in the reduction gear.

23. An information processing apparatus configured to acquire information about a robot including joints and a reduction gear, the information processing apparatus comprising:
one or more processors; and
at least one memory storing executable instructions, which when executed by the one or more processors, cause the information processing apparatus to perform operations comprising:
displaying the joints on a display unit such that a predetermined joint of the joints is selectable, and diagnosing whether an abnormality occurs to a predetermined reduction gear included in the selected predetermined joint; and
displaying history of diagnosis results of the predetermined reduction gear on the display unit.

24. A robot system comprising:
the robot about which the information is acquired by the information processing method according to claim 1; and
a control apparatus configured to control the robot.

25. A method of manufacturing an article using the robot about which the information is acquired by the information processing method according to claim 1.

26. A method of controlling a robot system including the robot about which the information is acquired by the information processing method according to claim 1 and a control apparatus configured to control the robot,
wherein the control apparatus controls the robot.

27. A non-transitory computer-readable storage medium storing a program for causing a computer to execute the information processing method according to claim 1.

28. The information processing method according to claim 1, wherein in a case where start of diagnosis of the predetermined joint is instructed, a diagnosis operation corresponding to the predetermined joint is automatically executed in the robot, and whether an abnormality occurs to the predetermined reduction gear is diagnosed.

* * * * *